(12) United States Patent
Hsu et al.

(10) Patent No.: US 11,759,879 B2
(45) Date of Patent: Sep. 19, 2023

(54) SYNCHRONIZED ROTATING ARC WELDING METHOD AND SYSTEM

(71) Applicant: ILLINOIS TOOL WORKS INC., Glenview, IL (US)

(72) Inventors: Christopher Hsu, Appleton, WI (US); Richard Martin Hutchison, Iola, WI (US); Kevin Michael Scott, Lyons, CO (US); Kevin Pagano, Algonquin, IL (US); James Lee Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 342 days.

(21) Appl. No.: 16/773,588

(22) Filed: Jan. 27, 2020

(65) Prior Publication Data
US 2020/0156172 A1 May 21, 2020

Related U.S. Application Data

(62) Division of application No. 14/481,507, filed on Sep. 9, 2014, now Pat. No. 10,543,551.

(Continued)

(51) Int. Cl.
*B23K 9/095* (2006.01)
*B23K 9/173* (2006.01)
(Continued)

(52) U.S. Cl.
CPC .......... *B23K 9/0956* (2013.01); *B23K 9/0216* (2013.01); *B23K 9/0953* (2013.01); *B23K 9/164* (2013.01); *B23K 9/173* (2013.01)

(58) Field of Classification Search
CPC ........ B23K 9/095; B23K 9/10; B23K 9/1087; B23K 9/0216; B23K 9/0953; B23K 9/0956; B23K 9/164; B23K 9/173
See application file for complete search history.

(56) References Cited

U.S. PATENT DOCUMENTS

| 2,340,796 A | 2/1944 | Chyle |
| 3,172,992 A | 3/1965 | Keller |

(Continued)

FOREIGN PATENT DOCUMENTS

| CN | 1212215 | 7/2005 |
| CN | 1665633 | 9/2005 |

(Continued)

OTHER PUBLICATIONS

Steve Barhorst: 'Metal cored electrode basics', The American Welder, Dec. 31, 2000 (Dec. 31, 2000), p. 1, XP002685315, American Welding Society Retrieved from the Internet: URL:http://www.aws.org/wj/amwelder/11-00/barhorst.html [retrieved on Oct. 16, 2012].

(Continued)

*Primary Examiner* — Christopher R Dandridge
(74) *Attorney, Agent, or Firm* — McAndrews, Held & Malloy, Ltd.

(57) ABSTRACT

A welding method includes feeding a welding electrode axially from a welding torch, moving the welding electrode radially in a desired pattern with respect to a central axis of the welding torch by a motion control assembly within the welding torch, transmitting from control circuitry a signal corresponding to a position of the welding electrode relative to a weld joint or weld pool, advancing the welding torch or a workpiece to establish a weld, and transferring material from the welding electrode to a first location in an area of the weld pool. The welding electrode moves radially while feeding the welding electrode from the welding torch, the material from the welding electrode is transferred to the first location during a first cycle of the desired pattern, and the first location is controlled based at least in part on the signal.

20 Claims, 13 Drawing Sheets

Related U.S. Application Data

(60) Provisional application No. 61/878,404, filed on Sep. 16, 2013.

(51) Int. Cl.
*B23K 9/02* (2006.01)
*B23K 9/16* (2006.01)

(56) References Cited

U.S. PATENT DOCUMENTS

| | | |
|---|---|---|
| 3,818,176 A | 6/1974 | Brown |
| 4,356,378 A | 10/1982 | Cloos |
| 4,441,011 A | 4/1984 | Nomura |
| 4,621,185 A | 11/1986 | Brown |
| 4,704,513 A | 11/1987 | Sugitani |
| 4,717,807 A | 1/1988 | Parks |
| 4,835,360 A | 5/1989 | Parks |
| 4,897,523 A | 1/1990 | Parks |
| 4,954,691 A | 9/1990 | Parks |
| 4,999,478 A | 3/1991 | Bushey |
| 5,030,812 A | 7/1991 | Sugitani |
| 5,040,125 A | 8/1991 | Okumura |
| 5,864,115 A | 1/1999 | Ikeda |
| 5,938,955 A | 8/1999 | Ikeda |
| 5,961,863 A | 10/1999 | Stava |
| 5,981,906 A | 11/1999 | Parker |
| 6,002,104 A | 12/1999 | Hsu |
| 6,051,810 A | 4/2000 | Stava |
| 6,093,906 A | 7/2000 | Nicholson |
| 6,172,333 B1 | 1/2001 | Stava |
| 6,204,478 B1 | 3/2001 | Nicholson |
| 6,215,100 B1 | 4/2001 | Stava |
| 6,267,291 B1 | 7/2001 | Blankenship |
| 6,441,342 B1 | 8/2002 | Hsu |
| 6,501,049 B2 | 12/2002 | Stava |
| 6,510,984 B2 | 1/2003 | Blankenship |
| 6,536,660 B2 | 3/2003 | Blankenship |
| 6,708,877 B2 | 3/2004 | Blankenship |
| 6,723,954 B2 | 4/2004 | Nikodym |
| 6,730,875 B2 | 5/2004 | Hsu |
| 6,909,066 B2 | 6/2005 | Zheng |
| 6,942,139 B2 | 9/2005 | Lipnevicius |
| 7,032,814 B2 | 4/2006 | Blankenship |
| 7,067,767 B2 | 6/2006 | Hsu |
| 7,087,860 B2 | 8/2006 | Nikodym |
| 7,109,439 B2 | 9/2006 | Stava |
| 7,204,792 B2 | 4/2007 | Hagihara |
| 7,304,269 B2 | 12/2007 | Fulmer |
| 7,397,015 B2 | 7/2008 | Peters |
| 7,683,290 B2 | 3/2010 | Daniel |
| 7,863,538 B2 | 1/2011 | Barhorst |
| 8,203,099 B2 | 6/2012 | Peters |
| 8,283,598 B2 | 10/2012 | Fulmer |
| 8,373,093 B2 | 2/2013 | Peters |
| 8,410,398 B2 | 4/2013 | Daniel |
| 8,445,816 B2 | 5/2013 | Cole |
| 8,937,267 B2 | 1/2015 | Peters |
| 9,511,442 B2 | 12/2016 | Panelli |
| 2003/0116548 A1 | 6/2003 | Blankenship |
| 2004/0026396 A1 | 2/2004 | Nikodym |
| 2005/0103766 A1 | 5/2005 | Iizuka |
| 2005/0224480 A1 | 10/2005 | Lipnevicius |
| 2006/0138115 A1* | 6/2006 | Norrish .................. B23K 9/09 219/137.71 |
| 2008/0041834 A1 | 2/2008 | Nishimura |
| 2008/0053978 A1 | 3/2008 | Peters |
| 2008/0245774 A1 | 10/2008 | Kim |
| 2009/0045172 A1 | 2/2009 | VanErk |
| 2009/0321402 A1 | 12/2009 | Doyle |
| 2010/0176104 A1 | 7/2010 | Peters |
| 2010/0301029 A1 | 12/2010 | Meckler |
| 2011/0155710 A1 | 6/2011 | Farah |
| 2011/0297658 A1 | 8/2011 | Peters |
| 2012/0061364 A1 | 3/2012 | Purslow |
| 2012/0097655 A1 | 4/2012 | Daniel |
| 2012/0097656 A1 | 4/2012 | Peters |
| 2012/0152920 A1 | 6/2012 | Enyedy |
| 2012/0152921 A1 | 6/2012 | Peters |
| 2013/0001210 A1 | 1/2013 | Pagano |
| 2013/0015170 A1* | 1/2013 | Peters .................. B23K 9/092 219/130.21 |
| 2013/0043219 A1 | 2/2013 | Peters |
| 2013/0048619 A1 | 2/2013 | Doyle |
| 2013/0092667 A1 | 4/2013 | Peters |
| 2013/0112675 A1 | 5/2013 | Peters |
| 2013/0146575 A1 | 6/2013 | Hillen |
| 2013/0153557 A1 | 6/2013 | Pagano |
| 2013/0175247 A1 | 7/2013 | Peters |
| 2013/0193124 A1 | 8/2013 | Peters |
| 2013/0213948 A1 | 8/2013 | Peters |
| 2013/0228555 A1 | 9/2013 | Peters |
| 2013/0264323 A1 | 10/2013 | Daniel |
| 2014/0027422 A1 | 1/2014 | Panelli |
| 2015/0076119 A1 | 3/2015 | Hsu |
| 2015/0076120 A1 | 3/2015 | Pagano |

FOREIGN PATENT DOCUMENTS

| | | | |
|---|---|---|---|
| CN | 101655705 | 2/2010 | |
| CN | 102581436 | 7/2012 | |
| DE | 4315780 | 11/1994 | |
| EP | 0076498 | 4/1983 | |
| EP | 0278620 | 8/1988 | |
| EP | 0402648 | 12/1990 | |
| EP | 0824985 | 2/1998 | |
| EP | 1710043 | 10/2006 | |
| EP | 1733838 | 12/2006 | |
| JP | S58107271 | 6/1983 | |
| JP | S59101280 | 6/1984 | |
| JP | S61132271 | * 12/1984 | ............... B23K 9/10 |
| JP | S644875 | 1/1989 | |
| JP | S1071580 | 3/1989 | |
| JP | H0191965 | * 4/1989 | ............... B23K 9/00 |
| JP | H0191966 | 4/1989 | |
| JP | 3018474 | 1/1991 | |
| JP | 4187380 | 7/1992 | |
| JP | 4200866 | 7/1992 | |
| JP | 0523856 | 2/1993 | |
| JP | H5023856 | 2/1993 | |
| JP | H2050023856 | 2/1993 | |
| JP | H05309476 | 11/1993 | |
| JP | H6122074 | 5/1994 | |
| JP | H0866771 | 3/1996 | |
| JP | 9094658 A | 4/1997 | |
| JP | H0994658 | 4/1997 | |
| JP | H09300072 | 11/1997 | |
| JP | H106004 | 1/1998 | |
| JP | 10052754 | 2/1998 | |
| JP | 2791400 | 8/1998 | |
| JP | H11239878 | 9/1999 | |
| JP | 2000158132 | 6/2000 | |
| JP | 2000301332 | 10/2000 | |
| JP | 2001259838 | 9/2001 | |
| JP | 2002239733 | 8/2002 | |
| JP | 2002316264 | 10/2002 | |
| JP | 2006159246 | 6/2006 | |
| JP | 2010253533 | 11/2010 | |
| JP | 2010269336 | 12/2010 | |
| SU | 1106619 | 8/1984 | |
| SU | 1593831 | 9/1990 | |
| WO | 2012076750 | 1/2012 | |
| WO | 2013045214 | 1/2013 | |

OTHER PUBLICATIONS

International Search Report from PCT application No. PCT/US2014/055090, dated, Dec. 18, 2014, 9 pgs.

International Search Report from PCT application No. PCT/US2014/055094, dated Apr. 30, 2015, 14 pgs.

International Search Report from PCT application No. PCT/US2012/044466 dated Nov. 5, 2012, 11 pgs.

International Search Report from PCT application No. PCT/US2012/069378 dated Apr. 2, 2013, 15 pgs.

(56) References Cited

OTHER PUBLICATIONS

International Search Report from PCT application No. PCT/US2013/052356 dated Dec. 2, 2013, 15 pgs.
Iwata, Shinji, Murayama, Masatoshi, and Kojima, Yuji; "Application of Narrow Gap Welding Process with High Speed Rotating Arc to Box Column Joints of Heavy Thick Plates," JFE Technical Report, No. 14, Dec. 2009, pp. 16-21.
Sugitani, Y, Kobayashi, Y, and Murayama, M, "Development and application of automatic high speed rotation and arc welding," Welding International, 5 (7), pp. 577-583, 1991.
Korean Office Action Appln. No. 10-2014-7019335 dated Oct. 17, 2018 (8 pages).

* cited by examiner

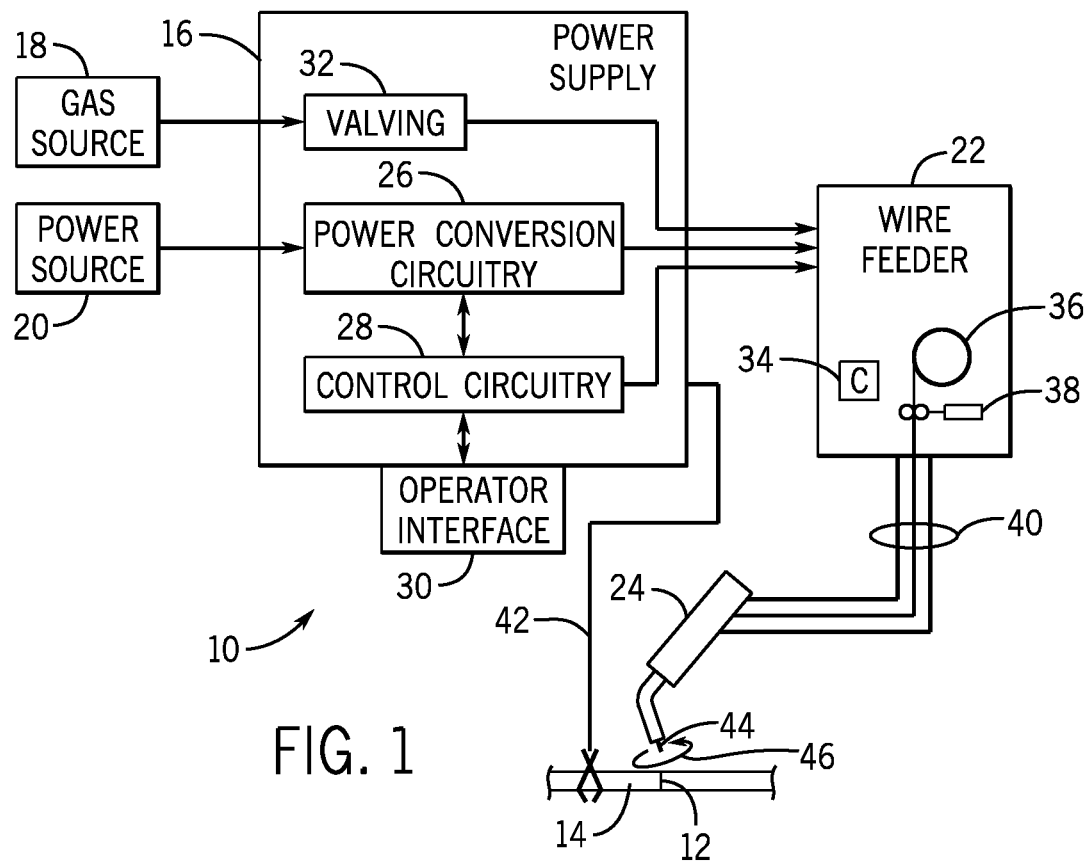
FIG. 1
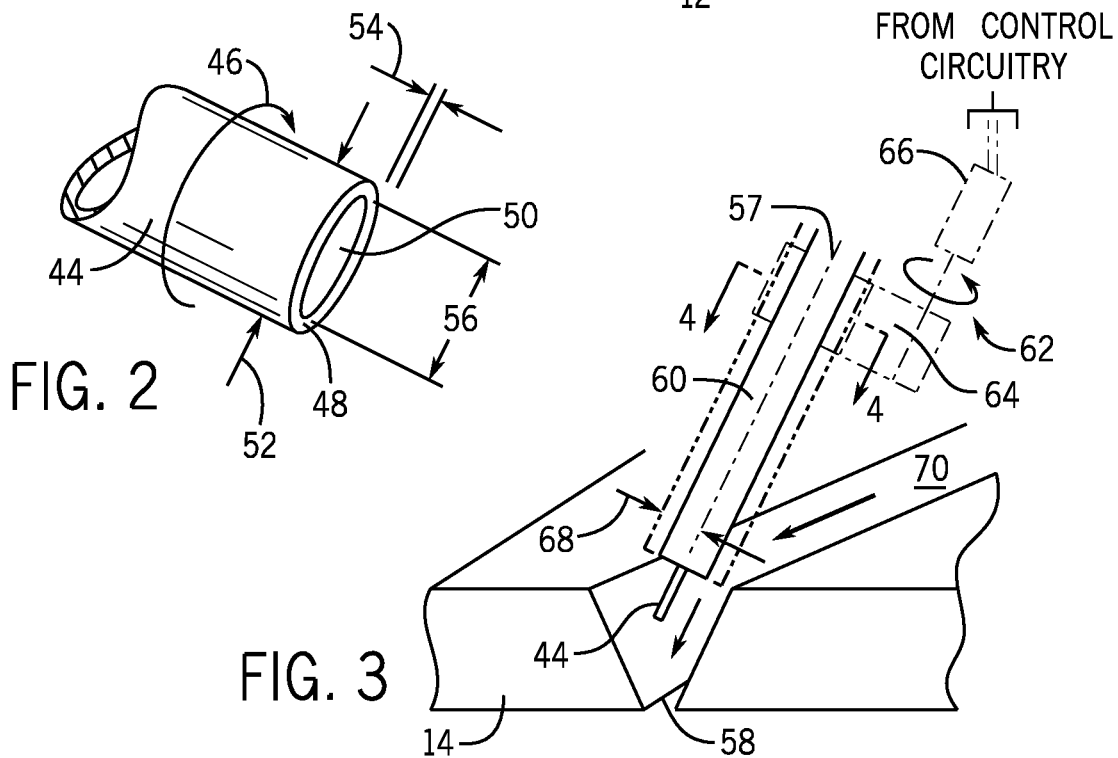
FIG. 2
FIG. 3

SYNCHRONIZED ROTATING ARC WELDING METHOD AND SYSTEM

CROSS-REFERENCE TO RELATED APPLICATIONS

This application is a division of U.S. application Ser. No. 14/481,507, entitled Synchronized Rotating Arc Welding Method and System, filed Sep. 9, 2014, which claims priority from and the benefit of U.S. Provisional Application Ser. No. 61/878,404, entitled "SYNCHRONIZED ROTATING ARC WELDING METHOD AND SYSTEM," filed Sep. 16, 2013. All applications are hereby incorporated by reference in their entirety for all purposes.

BACKGROUND

The invention relates generally to welding techniques, and more particularly to improved automated welding processes. The present disclosure is related to previously filed U.S. patent application Ser. No. 13/767,392, entitled "Adaptable Rotating Arc Welding Method and System," filed on Feb. 14, 2013, which is hereby incorporated into the present disclosure by reference. The present disclosure also incorporates U.S. patent application Ser. No. 13/526,278, entitled "Metal Cored Welding Method and System," filed on Jun. 18, 2012, and U.S. patent application Ser. No. 13/681,687, entitled "DC Electrode Negative Rotating Arc Welding Method and System," filed on Nov. 20, 2012.

A range of techniques have been developed for joining workpieces by welding operations. These include diverse processes and materials, with most modern processes involving arcs developed between a consumable or non-consumable electrode and the workpieces. Welding processes with non-consumable electrodes may include tungsten inert gas (TIG) welding processes, which employ a non-consumable tungsten electrode that is independent from the filler material. The processes are often grouped in such categories as constant current processes, constant voltage processes, pulsed processes, and so forth. However, further divisions between these are common, particularly in processes that consume an electrode to add filler metal to the weld. In virtually all such cases, the process selected is highly linked to the filler material and its form, with certain processes exclusively utilizing a particular type of electrode. Exemplary processes include, but are not limited to, metal inert gas (MIG) welding and pulsed gas metal arc welding (GMAW-P), both of which form part of a larger group sometimes referred to as gas metal arc welding (GMAW). In addition, in certain embodiments, other types of welding processes, such as metal active gas (MAG) processes, flux-cored arc welding (FCAW) processes, metal-cored arc welding (MCAW) processes, and so forth, may be implemented.

In GMAW welding, an electrode in the form of a wire is consumed by the progressing weld pool, melted by the heat of an arc between the electrode wire and the workpiece. The wire is continuously fed from a spool through welding torch where a charge is imparted to the wire to create the arc. The electrode types used in these processes are often referred to as either solid wire, flux cored or metal cored. Each type is considered to have distinct advantages and disadvantages over the others, and careful adjustments to the welding process and weld settings may be required to optimize their performance. For example, solid wire, while less expensive than the other types, is typically used with inert shielding gases, which can be relatively expensive. Flux cored wires may not require separate shielding gas feeds, but are more expensive than solid wires. Metal cored wires do require shielding gas, but these may be adjusted to mixes that are sometimes less expensive than those required for solid wires.

All three of these electrode types may be used with different transfer modes, referring to the mechanical and electromechanical phenomena of moving metal from the electrode tip to the progressing weld bead. A number of such transfer modes exist, such as short circuit transfer, globular transfer, spray transfer, and pulsed spray (e.g., droplet) transfer. In practice, transfer physics may appear as a hybrid of these, and the actual material transfer may transition between them during welding, although the process and electrode are often selected to maintain a certain transfer mode. In general, the material transfer may be assisted by the centrifugal force of the radial movement of the electrode 44 and, in certain embodiments, in combination with mechanical inertia of liquid metal at an end of the electrode 44 when axial movement of the electrode 44 slows in forward movement (i.e., toward the workpiece 14) or reverses direction from forward movement (i.e., toward the workpiece 14) to reverse movement (i.e., away from the workpiece 14), as described in greater detail below.

As the torch progresses and consumes the wire it leaves behind a deposit of filler material between the two workpieces known as a weld bead. In general the width of the weld bead created during the transfer mode is seen as a function of several operative parameters. Depending on the fit-up between the workpieces, the weld bead width may or may not be adequate to ensure the integrity of the finished welded product. To avoid this, a welding operator must visually detect the fit-up for any workpiece gaps prior to welding and compensate manually to ensure the integrity of the welded piece. However, automated welding systems lack this intelligent consideration and may not be tolerant of fit-up gaps beyond a narrow tolerance range. Moreover, excess heat applied to relatively thin portions of the workpieces and/or to the weld bead may form holes in the weld bead. This may result in weld defects, manual reworking, and ultimate rejection of finished welded parts.

Manufacturers are constantly looking for new ways to improve automated welding methods, increase the success rate of the welded pieces, and speed up the manufacturing process overall. However, current automated welding techniques coupled with the increased speed of the processes that manufacturers have come to rely on can result in many finished workpieces with poor fit-up.

BRIEF DESCRIPTION

In one embodiment, a welding method includes feeding a welding electrode axially from a welding torch, moving the welding electrode radially in a desired pattern with respect to a central axis of the welding torch by a motion control assembly within the welding torch, transmitting from control circuitry a signal corresponding to a position of the welding electrode relative to a weld joint or weld pool, advancing the welding torch or a workpiece to establish a weld, and transferring material from the welding electrode to a first location in an area of the weld pool. The welding electrode moves radially while feeding the welding electrode from the welding torch, the material from the welding electrode is transferred to the first location during a first cycle of the desired pattern, and the first location is controlled based at least in part on the signal.

In another embodiment, a welding method includes feeding a welding electrode axially from a welding torch, moving the welding electrode radially in a desired movement pattern with respect to a central axis of the welding torch by a motion control assembly within the welding torch, transmitting from control circuitry a signal corresponding to a position of the welding electrode within the desired movement pattern, advancing the welding torch or a workpiece to establish a weld, and controlling a heat pattern applied to at least one of the workpiece and an area of a weld pool based at least in part on the signal. The welding electrode moves radially while feeding the welding electrode from the welding torch.

In another embodiment, a welding method includes establishing an arc between a welding electrode and a workpiece, feeding the welding electrode from a welding torch while moving the welding electrode in a desired pattern with respect to a central axis of the welding torch at a radial movement rate between approximately 5 Hz and 200 Hz by a motion control assembly within the welding torch, advancing the welding torch or a workpiece to establish a weld, detecting a fit-up condition of the workpiece via monitoring changes in a weld current, a weld voltage, an arc voltage, or a contact tip to work distance, and controlling one or more welding parameters based at least in part on a position of the welding electrode within the desired pattern and the detected fit-up condition while maintaining the arc. The one or more welding parameters includes at least one of the radial movement of the welding electrode in the desired pattern, a parameter of the welding power applied to the welding electrode, a welding torch travel speed, a welding torch travel angle, and a welding torch angle.

A welding system includes, a welding torch configured to receive welding power and a welding wire, and a welding wire motion control assembly associated with the welding torch. The welding wire motion control assembly is configured to move the welding wire as the welding wire is advanced towards a workpiece to establish a weld. The welding wire motion control assembly is configured to move the welding wire radially in a desired pattern with respect to a central axis of the welding torch. The welding system includes control circuitry configured to alter the welding power to the welding wire and to control a transfer of material from the welding wire to a first location at an outer periphery of a weld pool.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of an exemplary welding system utilizing aspects of the present techniques;

FIG. 2 is a detailed view of an end portion of a metal cored electrode for use with the system of FIG. 1;

FIG. 3 is a diagrammatical view representing movement of the metal cored electrode in accordance with aspects of the present techniques;

DETAILED DESCRIPTION

Figure 4:
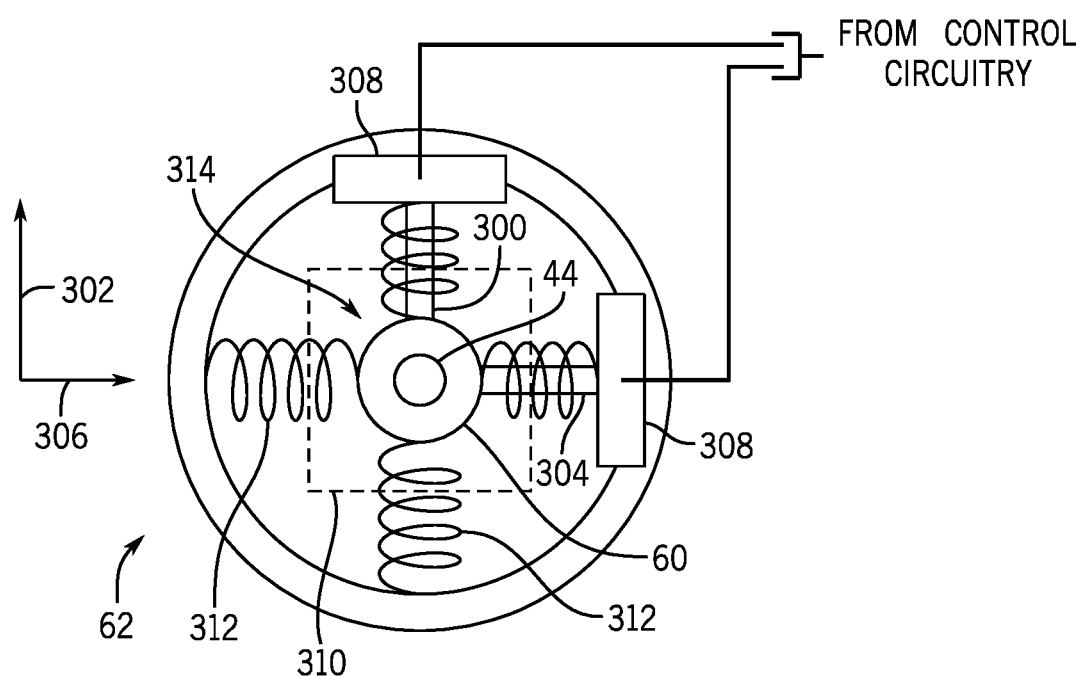
FIG. 4 is a cross-sectional top view of an embodiment of a motion control system of FIG. 3, taken along line 4-4.

FIG. 1 illustrates an exemplary welding system 10 utilizing movement of a metal cored welding wire electrode though as discussed earlier these techniques could be used with many types of wires, such as solid wire or flux cored wire. The system 10 is designed to produce a weld 12 on a workpiece 14. The weld may be oriented in any desired manner, including butt weld, lap weld, angled welds, out-of-position welds, and so forth. The system includes a power supply 16 that will typically be coupled to a gas source 18 and to a power source 20, such as the power grid. Other power sources, of course, include generators, engine-driven power packs, and so forth. A wire feeder 22 is coupled to the power supply 16 and supplies the metal cored welding wire to a welding torch 24.

In the illustrated embodiment, the power supply 16 will include power conversion circuitry 26 coupled to control circuitry 28 that regulates operation of the power conversion circuitry to produce power output suitable for the welding operation. The power supply may be designed and programmed to produce output power in accordance with a number of processes, welding regimes, and so forth, including constant current processes, constant voltage processes, pulsed processes, short circuit transfer processes, and so forth. Presently contemplated embodiments may be utilized with a variety of transfer processes including, but not limited to, short circuit transfer, globular transfer, spray transfer, and pulsed spray transfer. In a presently contemplated embodiment, the control circuitry 28 controls the power conversion 26 to produce a DCEN (sometimes referred to as a "straight" polarity) welding regime that aids in the transfer of material from the metal cored welding wire to a progressing weld bead. However, other welding regimes may of course be used. An operator interface 30 allows a welding operator to alter both the welding process and the process settings. Moreover, in certain contemplated embodiments the operator interface may allow selection modification of certain parameters related to movement of the welding torch and the metal cored welding wire. For example, the operator interface 30 may enable the operator to adjust proportional and/or integral gains from welding parameters synchronized with the radial movement rate of the electrode. Finally, the power supply may include valving 32 for regulating the flow of shielding gas from the gas source 18. Additionally, or in the alternative to utilizing a shielding gas, a submerged arc welding (e.g., SAW) process may be utilized in which the electrode and arc are submerged beneath a flux layer.

The wire feeder 22 will typically include control circuitry, illustrated generally by reference numeral 34, which regulates the feed of welding wire from a spool 36. The welding wire is advanced by a drive assembly 38, typically through the use of a small electric motor under the control of the control circuitry 34. Welding wire, gas, and control and feedback data may be exchanged between the wire feeder 22 and the welding torch 24 via a weld cable 40. The workpiece 14 is also coupled to the power supply by a work cable 42 to complete an electrical circuit through the electrode 44 when an electric arc is established between the electrode and the workpiece. As described more fully below, the electrode 44 advancing from the welding torch is forced to move, such as in a rotary motion as indicated by reference numeral 46.

The welding system illustrated in FIG. 1 may be designed for manual operation, although many of the applications for the present techniques will be automated. That is, the welding torch 24 will be secured to a robot or a fixed automation system which is programmed to position the welding torch at desired locations with respect to a workpiece. The robot may then act to initiate arcs between the electrode and the workpiece, and properly orient the welding torch and advance the welding torch along a predefined path where a weld bead is to be established to join two components. As described more fully below, in such automation applications, the present techniques allow for greatly enhanced travel speeds and improved weld bead characteristics.

The present techniques are designed for use with solid wire, flux cored or metal cored welding wires although in the present embodiment, a metal cored wire of the type illustrated in FIG. 2 is shown. Such welding wires generally comprise a sheath 48 made of metal wrapped around one or more metal cores 50. Various techniques are known for producing such metal cored welding wires, and are beyond the scope of the present invention. The characteristics of the metal cored welding wire may be selected for a particular application, particularly depending upon the metallurgy of the components to be joined, the type of shielding gas to be used, the anticipated fill volumes of the weld bead, and so forth. The same holds true for both solid wires and flux cored wires if either of these two are chosen in place of metal cored wires, as discussed earlier. In the illustrated embodiment, certain geometries of the metal cored welding wire may assist in enhancing the benefits of the electrode movement. For example, the welding wire will typically be selected to have a desired diameter 52. The diameter comprises a sheath wall thickness 54 and a core diameter 56. These parameters may be altered and optimized to enhance the performance of the welding wire and to provide such characteristics as improved arc establishment, arc maintenance, material transfer, metallurgy of the resulting weld bead, weld bead penetration, and so forth.

In a presently contemplated embodiment, specific wires may be selected for use with DCEN welding regimes. As discussed more fully below, for example, it has been found that the combination of "spin-arc" movement with DCEN processes and wires such as wires comprising stabilizers, and other components, such as manganese (e.g., AWS E5.18 70C-6; and more generally, E5.18 XXC-6, where "XX" denotes tensile strength) provide excellent results. One such wire is commercially available under the name Metalloy® X-Cel™ from Hobart Brothers of Troy, Ohio. Still further, certain formulations of welding wire are believed to provide benefits beyond those obtainable with other wires. Such formulations are described in U.S. Pat. No. 6,723,954, entitled Straight Polarity Metal Cored Wire, issued to Nikodym et al. on Apr. 20, 2004; U.S. Pat. No. 7,087,860, entitled Straight Polarity Metal Cored Wire, issued to Nikodym et al. on Aug. 8, 2006; and U.S. Pat. No. 7,863,538, entitled Metal-Core Gas Metal Arc Welding of Ferrous Steels with Noble Gas Shielding, issued to Barhorst et al. on Jan. 4, 2011, which are all hereby incorporated into the present disclosure by reference. Moreover, certain composition modifications may be made so such wires to enhance their performance in DCEN processes with forced movement of the arc, as discussed below.

FIG. 3 illustrates movement of the welding wire in a typical application. As shown in FIG. 3 a joint 58 is to be formed between workpieces, and the welding torch with the electrode 44 extending from it is positioned in close vicinity to the intended joint. An arc is then established between the electrode and the underlying metal to be joined. The electrode emanates from a contact element 60 which can be moved to force motion of the electrode and the established arc. For movement of the contact element, a motion control assembly 62 is provided in the welding torch. Although numerous techniques may be utilized for forcing such motions, in a presently contemplated arrangement shown in phantom lines, a cam 64 is turned by a motor 66 which itself is controlled and powered by the control circuitry of the system.

It will be appreciated that the control circuitry 28 of the power supply 16 (and/or the control circuitry 34 of the wire feeder 22) illustrated in FIG. 1 may control the motion control assembly 62 to cause the desired movement of the electrode 44. In certain embodiments, data relating to the position of the electrode 44 with respect to the weld joint 58 may not be able to be generated by the motion control assembly 62 alone. The control circuitry 28 (and/or control circuitry 34) may take data relating to the torch 24, including data relating to the motion control assembly 62, into account to generate a signal representing the position of the electrode 44 with respect to the weld joint 58 or the weld pool 74. The generated signal relating to the position of the electrode 44 may be used by the control circuitry 28 (and/or control circuitry 34) to control various parameters of the welding process (e.g., current, voltage, wire feed speed, and any of the other parameters described herein). In addition, in certain embodiments, the control circuitry 28 (and/or control circuitry 34) may use the signal for seam tracking purposes, heat input control purposes, contact tip to work distance (CTWD) control purposes, and/or nominal arc length control purposes. In certain embodiments, the signal may be based at least in part on radial position data of the electrode 44 from a radial movement controller, axial movement data of the electrode 44 from an axial movement controller, or torch angle data, travel angle data, or torch offset (e.g., from joint center) data from a robot controller. In addition, in certain embodiments, the signal may be based at least in part on the radial position of the electrode 44 relative to the weld joint 58 or the weld pool 74.

Figure 23:
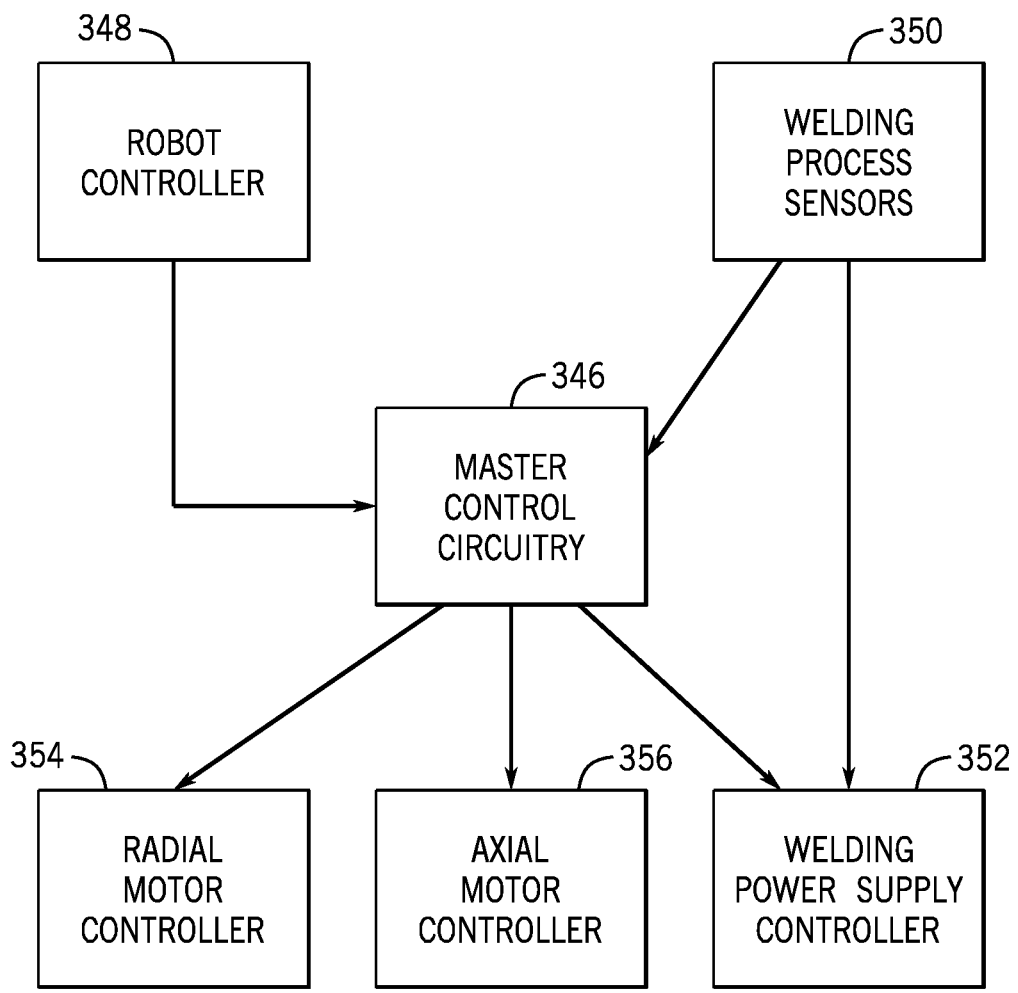
FIG. 23 is a schematic block diagram of control components of the welding system.

FIG. 23 illustrates a schematic block diagram of control components of the welding system 10. As illustrated, the welding system 10 may include master control circuitry 346 (e.g., which may include the control circuitry 28 and/or the control circuitry 34 in certain embodiments). In certain embodiments, a robot controller 348 that is generally responsible for controlling movement (e.g., torch angle, travel angle, torch offset, and so forth) of the welding torch 24, including all of the torch elements described with respect to FIG. 3, may provide data relating to position, velocity, direction of travel, and so forth, of the welding torch 24 with respect to the weld joint 58 or the weld pool 74 to the master control circuitry 346. In addition, welding process sensors 350 disposed within the welding system 10 may provide data relating to welding process parameters, such as actual arc voltage and current, to the master control circuitry 346 and/or to a welding power supply current controller 352 (e.g., the power conversion circuitry 26 of the power supply 16 of FIG. 1). In general, the master control circuitry 346 may use the data received from the robot controller 348 and the welding process sensors 350 to determine the signal relating to the position of the electrode 44 relative to the weld joint 58 or the weld pool 74, and to send control signals to a radial motor controller 354 (e.g., radial movement controller), an axial motor controller 356 (e.g., axial movement controller), and/or the welding power supply current controller 352 for controlling radial movement of the electrode 44, axial movement of the electrode 44, and welding parameters of the arc, and so forth, respectively. It will be appreciated that all of the control circuitry and controllers described herein may include hardware elements (including certain types of circuitry), software elements (including computer code stored on a non-transitory computer-readable medium), or a combination of both hardware and software elements.

In certain embodiments, a touch sensing procedure may be used to calibrate the data relating to positioning of the electrode 44 with respect to the weld joint 58 or the weld pool 74. Such a procedure may include the welding torch 24 being moved until the electrode 44 or some portion of the welding torch 24 touches the workpiece 14 or some other structure, and the control circuitry 28 (and/or control circuitry 34) makes note of the position. In certain embodiments, the control circuitry 28 (and/or control circuitry 34) may make assumptions that the welding torch 24 is being held in a certain manner, and that production variation is negligible, thus obviating the need for the touch sensing procedure. However, such touch sensing procedure may help calibrate the position data expected by the control circuitry 28 (and/or control circuitry 34).

In some embodiments, the motion control assembly 62 includes one or more solenoids coupled to sides (e.g., orthogonal sides) of the contact element 60 to move the contact element 60 and electrode 44 in a desired pattern. In certain embodiments, the solenoids may include voice coils to move the contact element 60 and electrode 44 in the desired pattern. As used herein, the term "pattern" is intended to connote the progression of locations of the electrode 44 during one cycle of movement, wherein the cycle ends at the same location as the beginning location. In other words, the location of, for example, an end of the electrode 44 may begin one cycle of the pattern at an axial and radial location with respect to the welding torch 24, traverse a path having varying axial and radial locations with respect to the welding torch 24 during the cycle, and end the cycle at generally the same axial and radial location with respect to the welding torch 24 as when the cycle began. As such, the pattern may be referred to as a closed-form pattern.

Furthermore, it is noted that the axial and radial movement patterns of the electrode 44 described herein are from the standpoint of a stationary body of the welding torch 24. More specifically, in operation, a robot controller (e.g., the robot controller 348 illustrated in FIG. 23) will move the body of the welding torch 24, but this motion is independent of the patterns of movement of the electrode 44 described herein. In other words, the patterns of movement of the electrode 44 as described herein are relative to the body of the welding torch 24, which is assumed to be stationary from the standpoint of the electrode 44 (although, again, the body of the welding torch 24 may actually be independently moving). It will be appreciated that the motion control assembly 62 has certain components that move relative to the body of the welding torch 24, and which cause other components (e.g., the contact element 60, etc.) of the welding torch 24 to effectuate the axial and radial movements of the electrode 44 with respect to the body of the welding torch 24, which may be independently moved, for example, by the robot controller 348.

FIG. 4 illustrates a top view cross-section of an embodiment of the motion control assembly 62 of FIG. 3, taken along line 4-4. A first solenoid 300 or voice coil coupled to the contact element 60 may move the electrode 44 along a first axis 302, and a second solenoid 304 or voice coil coupled to the contact element 60 may move the electrode 44 along a second axis 306. The control circuitry 28 may control the movement of the electrode 44 along the desired pattern via control signals supplied to one or more solenoid controllers 308. Additionally, or in the alternative, the motion control assembly 62 includes permanent and/or electromagnets coupled to sides (e.g., orthogonal sides) of the contact element 60 to attract or repel the contact element 60 in the desired pattern. Furthermore, one or more piezoelectric actuators, one or more linear actuators, one or more linear motors, or one or more planetary gears, or any combination thereof, may be coupled to sides (e.g., orthogonal sides) of the contract element 60. In some embodiments, the first solenoid 300 may move the contact element 60 along the first axis 302 at a first frequency and the second solenoid 304 may move the contact element 60 along the second axis 306 at a second frequency. The first and second frequencies may be the same or different. As may be appreciated, the frequencies may be varied to control the movement of the contact element 60 and the electrode 44 to substantially any point within a movement area 310. For example, the control circuitry may control the first and second solenoids 300, 304 to move the contact element 60 in a desired pattern along a Lissajous curve. The motion control assembly 62 may include one or more bias elements 312 (e.g., springs) coupled to the contact element 60 to position the contact element 60 in a substantially neutral position 314 unless otherwise controlled by the motion control assembly 62. The contact element 60 and electrode 44 are thus forced to move in a predefined pattern and at a predefined frequency as determined by the geometry and control of the motion control assembly 62. In some embodiments, the operator may adjust the acceleration and/or deceleration of a motor controlling the movement of the electrode.

Returning to FIG. 3, the tip of the contact element 60, and thus the electrode 44, may be moved a predetermined distance or radius 68 from an axis 57 of the torch 24. As described below, various patterns may be utilized for this motion. The pattern may be a symmetric or asymmetric pattern with respect to the joint 58. The desired pattern includes a radial portion within a plane perpendicular to the axis 57 of the torch 24, as discussed below. In some embodiments, the desired pattern includes an axial portion that enables the electrode 44 to move along the axis 57 of the torch 24, such as to move into and/or out of the joint 58. For example, the electrode 44 may be moved such that the established arc heats a relatively thick workpiece more than a relatively thin workpiece. In some embodiments, the established arc may be moved to control a heat pattern applied to the workpiece to enable the welding system 10 to expand a tolerance range of a fit-up gap that may joined by the weld bead. The electrode 44 is advanced during this process to form the desired weld bead. Moreover, the entire assembly is moved at a desired travel speed as indicated by reference numeral 70.

Figure 5:
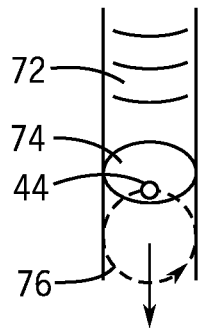
FIG. 5 is a diagrammatical representation of a progressing weld bead utilizing a circular pattern for movement of a metal cored welding wire.

FIG. 5 illustrates an exemplary progressing weld bead 72 along with certain patterns of motion of the electrode 44. As will be appreciated by those skilled in the art, the weld bead progresses behind a weld pool or puddle 74 comprised of molten metal resulting from heating of the electrode 44 and surrounding metal of the base materials of the workpieces 14. The electrode in the illustration of FIG. 5 is moved in a generally circular pattern as indicated by reference numeral 76. It is presently contemplated that such motion may be coordinated with the travel speed of the welding torch and/or the workpiece such that the electrode will be sufficiently close to the weld puddle 74 and peripheral regions of the workpiece to maintain the arc and to move the arc between these regions, maintaining the weld puddle while heating the electrode and surrounding metal. As described below, it is also contemplated that other coordinating factors may be employed, such as wire feed speeds, rates or frequencies of movement of the electrode, pulse frequencies or DC parameters for the welding process (e.g., currents and voltages applied to create the arc) and so forth.

Figure 6:
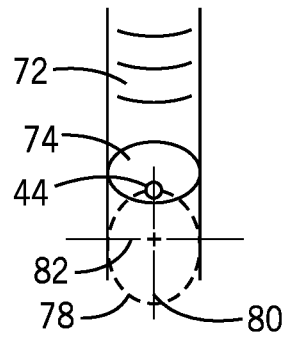
FIG. 6 is a similar illustration of a progressing weld bead utilizing a an elliptical path for a metal cored welding wire.
Figure 7:
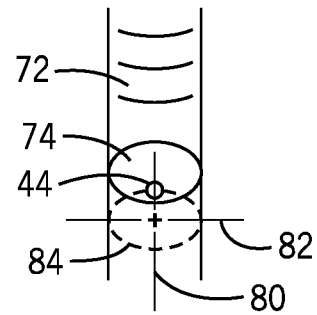
FIG. 7 is a further illustration of a progressing weld bead utilizing a differently oriented elliptical path for a metal cored welding wire

FIG. 6 illustrates a further possible pattern for movement of the electrode, in this case a generally elliptical pattern 78. The ellipse in this case has a major axis 80 along the direction of travel of the weld and the torch, and a minor axis 82 transverse to the direction of travel. Moreover, FIG. 7 illustrates a further possible pattern, namely a transverse elliptical pattern 84 in which a major axis 80 of the elliptical movement is transverse to the direction of travel of the weld and the torch. It should be noted, however, any desired pattern may be utilized, and the motion control assembly may be adapted to implement these patterns, among others. The desired pattern may include, but is not limited to, a pattern with one or more straight lines and/or one or more curves. In some embodiments, the desired pattern may include a pause or break in the pattern, such as a time interval in which the motion control assembly does not move the electrode 44. The desired pattern may include a circle, an ellipse, a zigzag, a FIG. 8, a transverse reciprocating line, a crescent, a triangle, a square, a rectangle, a non-linear pattern, an asymmetrical pattern, a pause, or any combination thereof. As may be appreciated, a pattern or a combination of patterns may be used and optimized for particular welds and/or welding positions.

Figure 8:
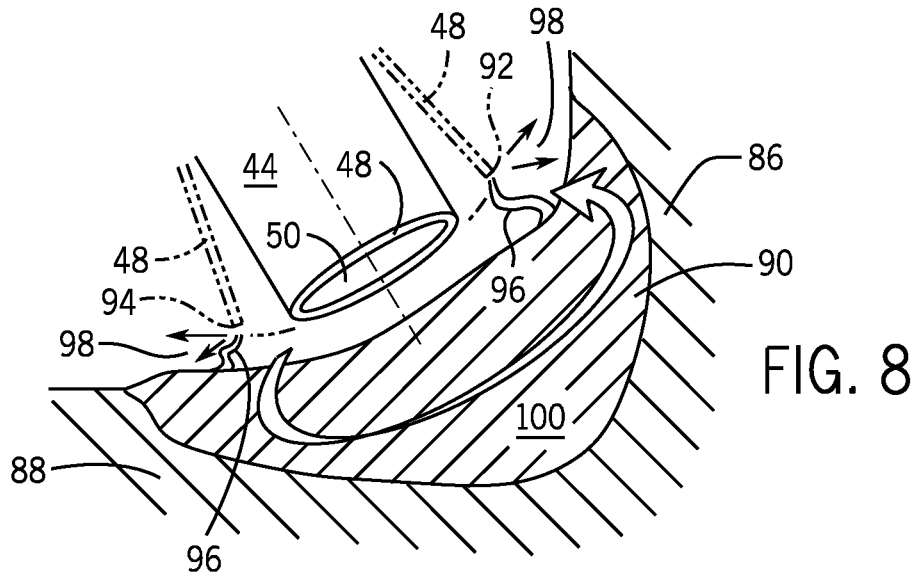
FIG. 8 is an illustration of an exemplary arc location and transfer mode for a progressing weld bead utilizing a moving metal cored welding wire electrode.

FIG. 8 shows an exemplary deposition and penetration scheme believed to operate when a metal cored welding wire is utilized with forced motion. That is, the electrode 44 is moved between workpieces 86 and 88 to be joined. A weld bead 90 forms that penetrates into the workpieces and creates a generally flat surface as the weld bead advances. In the illustration of FIG. 8, reference numeral 94 refers to a maximum approach of the sheath 48 of the welding wire toward workpiece 86, while reference numeral 94 represents a maximum approach of the sheath 48 to the workpiece 88.

In the present embodiment it is believed that the arc established between the metal cored welding wire and the workpieces and/or the progressing weld puddle exists only between the sheath 48 and these elements. Accordingly, unique transfer locations are established as indicated by reference numeral 98. It has been observed that resulting welds are flatter than similar welds that may be established by electrode motion using solid wire electrodes. Moreover, it is believed that enhanced penetration into the base materials is obtained as indicated by reference numeral 100. However, this should not be seen as a limitation to any particular types of wire that can be used. As discussed earlier, the present techniques can also be used with solid wire and flux cored wire in addition to metal cored wire.

Material from the electrode 44 is deposited as the electrode 44 moves in the desired pattern of motion (e.g., circular pattern 76). The wire feed speed and contact tip to workpiece distance (CTWD) parameters may be defined herein as axial movement relative to an axis 57 of the torch 24, whereas the movement of the electrode 44 in a plane perpendicular to the axis of the torch 24 may be defined as radial movement. The radial movement of the electrode 44 may include movement in a pattern (e.g., circular pattern 76) in the plane perpendicular to the axis of the torch 24 and rotational (e.g., spinning) movement of the electrode 44 in the plane perpendicular to the axis of the torch 24. In some embodiments, the radial movement may be controlled independent of the axial movement of the electrode 44. Accordingly, the deposition rate of the electrode 44 may be substantially independent of the radial movement of the electrode 44. For example, the welding system 10 may control the heat and/or filler material application to the joint via control of the radial movement without retracting the electrode in the axial direction. As may be appreciated, retraction of the electrode in the axial direction may affect the deposition rate of the filler material.

Parameters that may be varied in the technique may include factors such as the rate of radial movement of the electrode, and the degree of movement of the electrode about a normal or central position. In particular, while the invention is certainly not limited to a circular pattern, where circular patterns have been used, it is believed that rates of radial movement of approximately 50 Hz, and extending to 100-120 Hz and higher may be desirable, leading to flatter weld beads and higher deposition rates. In some embodiments, the electrode 44 may move (e.g., spin) circumferentially while moving radially (e.g., in circular pattern). Molten balls transferred from the moving electrode 44 may have a tangential velocity due to the radial electrode movement that causes the balls to interface with the workpieces at positions other than directly below where the ball detaches from the electrode 44. As described herein, the rate of radial movement of the electrode 44 may be controlled so that the balls are deposited at desired locations on the workpiece, the joint, and/or the weld pool. For rates of radial movement less than approximately 150 Hz, the centripetal force on the balls from the radial movement may enable substantially consistent control of the deposition location of the balls.

In general, the rate of radial movement of the electrode 44 may be greater than approximately 2.5 Hz, greater than approximately 3.0 Hz, greater than approximately 3.5 Hz, greater than approximately 4.0 Hz, greater than approximately 4.5 Hz, or greater than approximately 5.0 Hz. In some embodiments, the rate of radial movement of the electrode 44 may be between approximately 5 to 200 Hz, approximately 10 to 150 Hz, approximately 30 to 100 Hz, or approximately 50 to 90 Hz. It is noted that the relatively high rates of radial movement of the electrode 44 are achieved by oscillating only certain portions of the welding torch 24, as opposed to the entire welding torch 24. For example, as illustrated in FIG. 3, in certain embodiments, only the contact element 60 and the electrode 44 may be caused to oscillate by the motion control assembly 62. In this manner, the reduced inertial requirements facilitate the relatively high rates of radial movement of the electrode 44.

The rate of radial movement may be based at least in part on a shielding gas, the wire diameter, the wire material, the workpiece material, the welding process, the movement pattern, or the surface tension of the molten electrode ball, or any combination thereof. The range of radial movement rates may correspond to certain types of transfer processes and/or movement patterns. For example, the radial movement rate for SAW welding processes may be less (e.g., 5 Hz to 30 Hz) than MIG welding processes, which may be utilized with radial movement rates between approximately 50 Hz to 100 Hz. In some embodiments, a figure-8 or a circular movement pattern may have a lower radial movement rate than a zigzag movement pattern. Moreover, diameters of radial movement are presently contemplated on the order of approximately 1.0 to 1.5 mm, but higher diameters, such as on the order of approximately 4.0 mm may be desired. It may also be desirable to provide electrode movement that is synchronized or coordinated with gas flow. These various parameters may assist in the penetration into the base materials, the deposition of the electrode material, the maintenance of the arc, as well as other welding parameters.

It is also believed that the weld puddle may move better with movement of the metal cored electrode, possibly due to mechanical forces (e.g., centripetal forces) imparted on the molten ball or spray that develops at the electrode tip. The process may thus be able to run cooler than previous processes. Enhanced benefits may be offered as well on certain types of workpieces and workpiece metallurgies, particularly galvanized workpieces. Furthermore, the process may allow for less expensive shielding gasses, such as $CO_2$ rather than argon mixes are currently used with such welding electrodes. As discussed earlier, sold wires and flux cored wires may be used with the present techniques as well and may each bring their own advantages to the process.

Figure 9:
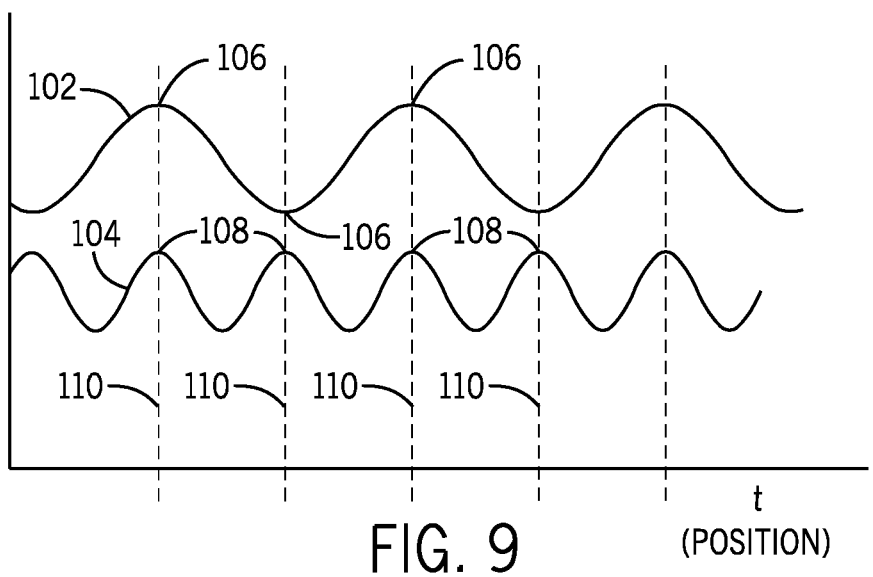
FIG. 9 is a timing diagram illustrating movement of a metal cored welding electrode together with an exemplary forced transfer trace.

FIG. 9 illustrates an exemplary timing diagram relating movement of the metal cored welding electrode with forced transfer of material from the electrode tip. In diagram of FIG. 9, electrode tip movement is indicated by trace 102 over time, while forced transfer is indicated by trace 104. In a circular movement pattern, a generally sinusoidal motion will be expected from the point of view of any particular point in the advancing weld bead or, the puddle, or any particular location of the joint. At points 106 in this motion, the sheath of the electrode may most closely approach the sides of the base materials of the workpiece. The welding process may be adapted, such as by control of pulsed welding regimes or control of current during constant voltage welding regimes, to force or enhance transfer of material from the electrode at these locations, as indicated generally by reference numeral 108. These times will typically occur periodically as indicated by times 110. These and many other control regimes may be envisaged as described above for coordinating transfer modes with motion of the metal cored welding electrode, particularly making use of the establishment of the arc with the sheath of the electrode only. As discussed earlier, this should be seen as an illustrative example, as the present techniques can be used with solid wires as well as flux cored wires, in addition to metal cored wires.

Figure 10:
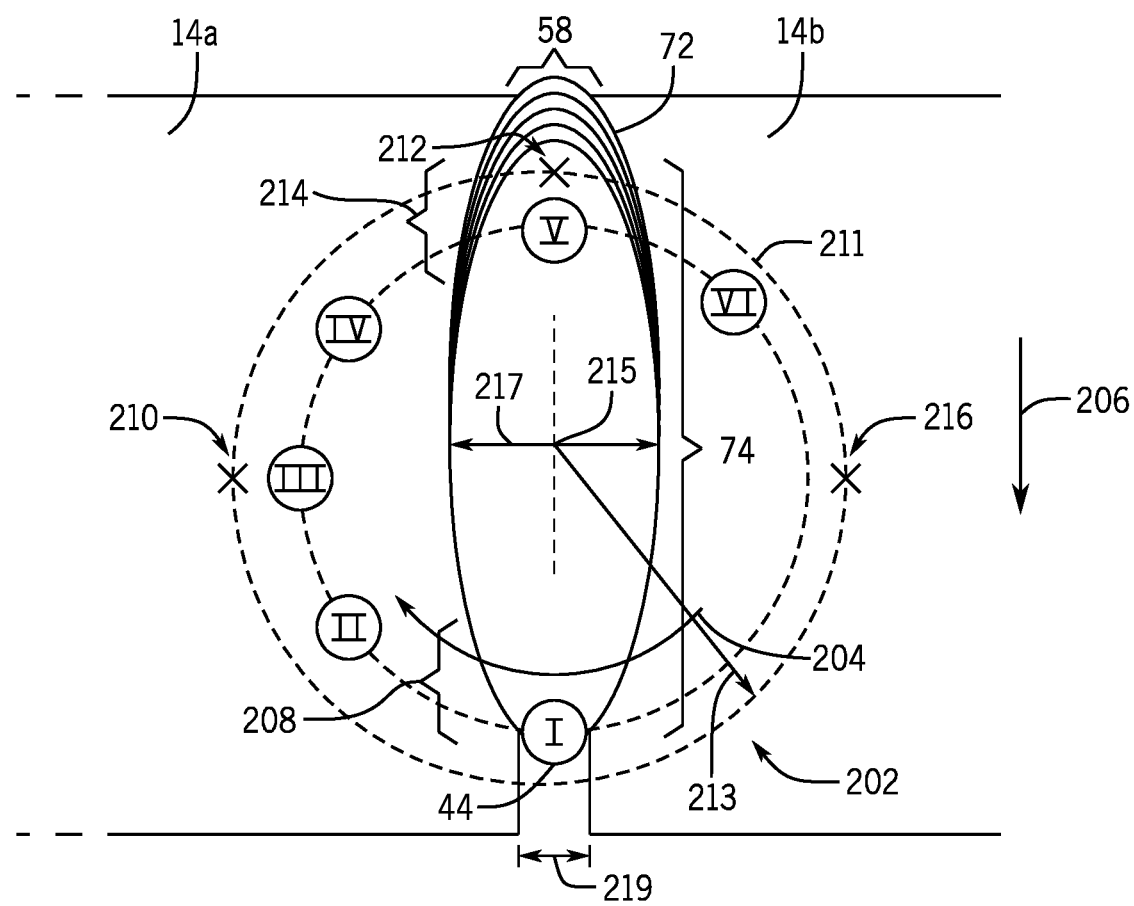
FIG. 10 is a diagrammatical view representing positions of the electrode in a movement pattern during an arc transfer process.

The radial movement of the electrode 44 may be synchronized with the forced transfer of material from the electrode tip to enable the transfer of material at one or more specific points along the desired pattern relative to the joint. The forced transfer of material may be due to a pulsed current and/or voltage from a pulse transfer mode and/or a constant voltage transfer mode in which the current is controlled. FIG. 10 illustrates a radial portion 202 of the desired pattern of the electrode 44 in a tangential direction 204 over the joint 58 between two workpieces 14a and 14b. While the radial portion 202 of the desired pattern shown in FIG. 10 is approximately the circular pattern 76, it may be appreciated that other desired patterns described above may be synchronized with the forced transfer of material from the electrode tip. The control circuitry 28 controls the movement of the electrode 44 and the establishment of the arc to control the heat (e.g., heating pattern) applied to the workpieces 14a, 14b and the weld pool 74 as the electrode 44 moves in the travel direction 206. Reducing heat input to the weld pool 74 over the joint 58 may reduce weld defects (e.g., holes, thinning, burn-through) in the progressing weld bead 72. Specifically, reducing heat input to a front 208 of the weld pool 74 may reduce weld defects in the weld bead 72.

For example, the control circuitry 28 controls an arc to heat the electrode 44 at position I, which forms a first ball that detaches from the electrode 44 at position II. The first ball may be deposited at approximately a location 210 in an area 211 of the weld pool 74 (e.g., on a root face or side wall of the workpiece 14a, on a side of the weld pool 74) due to the tangential movement of the first ball relative to the electrode 44. The control circuitry 28 controls an arc to heat the electrode 44 at position III, which forms a second ball that detaches from the electrode 44 at position IV. Similar to the first ball, the second ball may be deposited at approximately a location 212 in the area 211 of the weld pool 74 (e.g., at a rear 214 of the weld pool 74, on the solidifying weld bead 72) due to the tangential movement of the second ball relative to the electrode 44. The control circuitry 28 controls an arc to heat the electrode 44 at position V, which forms a third ball that detaches from the electrode 44 at position VI. The third ball may be deposited at approximately a location 216 in the area 211 of the weld pool 74 (e.g., on the root face or side wall of the workpiece 14b, on a side of the weld pool 74) due to the tangential movement of the third ball relative to the electrode 44. The control circuitry 28 may control the arc so that the electrode 44 does not form a ball that may be deposited at the front 208 of the weld pool 74. As discussed herein, the area 211 of the weld pool 74 may be approximately a distance 213 from a center 215 of the weld pool 74, where the distance 213 is based at least in part on a width 217 of the weld pool 74 and/or a width 219 of the joint 58. For example, the distance 213 may be less than approximately 2, 3, 4, or 5 times the width 217 of the weld pool 74, or the distance 213 may be less than approximately 2, 3, 4, 5, 6, 7, 8, 9, or 10 times the width 219 of the joint 58. The area 211 may include the joint 58 between the workpieces, the weld pool, the side wall of the workpiece, or a portion of the solidifying weld bead 72, or any combination thereof.

Locations 210 and 216 may be thicker than the weld pool 74. Accordingly, the control circuitry 28 may synchronize the arc and movement of the electrode 44 to apply more heat to the workpieces at locations 210 and 216 than to the weld pool 74. In some embodiments, the motion control assembly 62 supplies a signal to the control circuitry 28 that corresponds to the position of the electrode 44 relative to the joint. The control circuitry 28 may utilize the position signal to synchronize the heat application to the workpiece and/or to synchronize the transfer of material to the weld pool 74. Synchronizing the transfer of material to the electrode position enables the welding system to increase a fit-up gap tolerance window to form the joint through controlled application of the electrode material. In some embodiments, the control circuitry 28 controls the arc to deposit more balls from the electrode 44 at locations 210 and 216 than at location 212 at the rear 214 of the weld pool 74 or at the front 208 of the weld pool 74. As may be appreciated, the front 208 of the weld pool 74 may be thinner than the rear 214 of the weld pool 74. The control circuitry 28 may control the arc to deposit more balls from the electrode 44 at the rear 214, sides (e.g., locations 210 and 216), or a middle of the weld pool 74 than at the front 208 of the weld pool 74.

Figure 11:
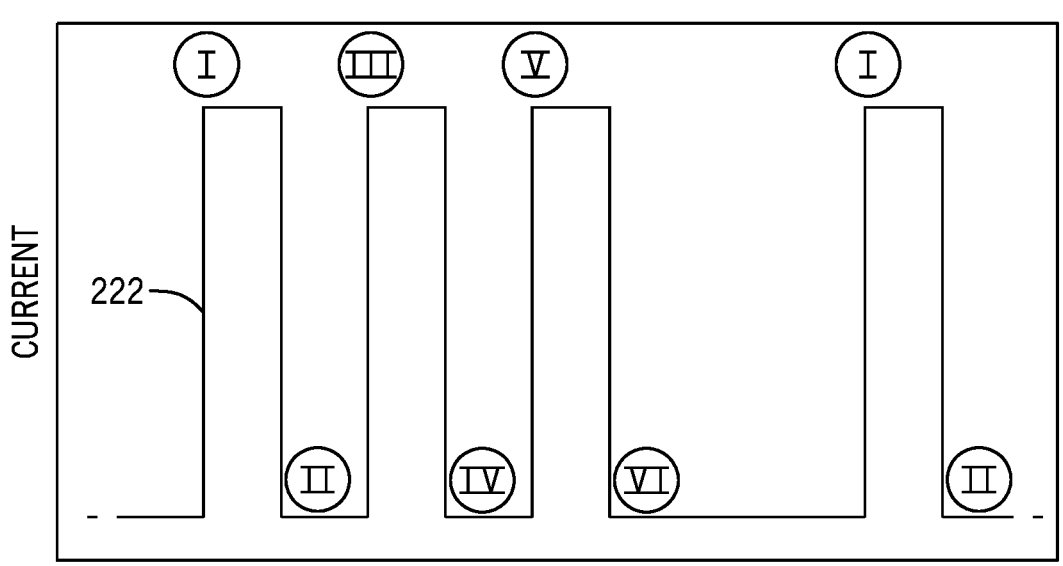
FIG. 11 is a timing diagram of a current waveform applied to the electrode during the movement pattern of FIG. 10.

FIG. 11 is a graph 220 of the current waveform 222 applied to the electrode 44 while the electrode 44 moves along the radial portion 202 of the desired pattern illustrated in FIG. 10. The current waveform 222 may be controlled according to a pulsed process or a constant voltage process. The current waveform 222 is relatively high when the electrode 44 is at positions I, III, and V where the control circuitry 28 controls the arc to form the balls on the electrode 44. The current waveform 222 is relatively low when the electrode 44 is at positions II, IV, and VI when the ball detaches from the electrode 44. As may be appreciated, this drop in the current waveform at positions II, IV, and VI may reduce the heating of the electrode 44 and/or the workpieces 14a, 14b at those positions, and may reduce spatter from the weld pool 74. In some embodiments, the current waveform 222 and/or the polarity of the current waveform 222 has a pattern based at least in part on the movement of the electrode 44. For example, the electrode 44 may have a positive polarity at positions I, II, and III for cathodic cleaning of the workpiece oxide, and the electrode 44 may have a negative polarity at positions IV, V, and VI to increase the heating, and thereby a melt rate, of the electrode 44. In some embodiments, a period 224 of the current waveform 222 may be related to the rate of radial movement (e.g., oscillation) of the electrode 44. For example, the period 224 (seconds) of the current waveform 222 may be approximately the inverse of the rate of radial movement (Hz) of the electrode 44. It will be appreciated that, in certain embodiments, the current waveform 222 may also be a function of axial movement of the electrode 44, as described herein.

In some embodiments, the desired pattern includes an axial portion in which the electrode 44 moves axially relative to the axis of the torch. For example, as illustrated in FIG. 3, in certain embodiments, the motion control assembly 62 may be configured to cause the contact element 60 to translate axially along the axis 57 such that the electrode 44 is brought closer to or farther away from the weld joint 58, thereby enabling an axial portion of movement (e.g., parallel to the axis 57) in addition to the radial portions of movement that occur in a plane generally perpendicular to the axis 57). As such, the motion of the electrode 44 with respect to the weld joint 58 may be three-dimensional in nature. In other words, in addition to the ability to create a weaving pattern of the electrode 44 in a plane generally perpendicular to the axis 57, the motion control assembly 62 may have the ability to move the electrode 44 axially to create a three-dimensional motion pattern with respect to the weld joint 58 and, as described herein, these three-dimensional motion patterns may be accompanied by modification of certain welding parameters (e.g., current, voltage, heat input, polarity, wire feed speed, and so forth) at different points along the three-dimensional motion patterns. It will be appreciated that the three-dimensional patterns include bends and/or twists that are generated via coordination of the axial and radial movements of the electrode 44. Furthermore, in addition to (or alternatively to) enabling translation of the electrode 44 via translation of the contact element 60, in certain embodiments, a controlled short-circuit (CSC) transfer process may be used to move the wire forward and backward for axial movement in synchronization with the radial motion, thereby facilitating creation of the three-dimensional pattern of motion.

Figure 12:
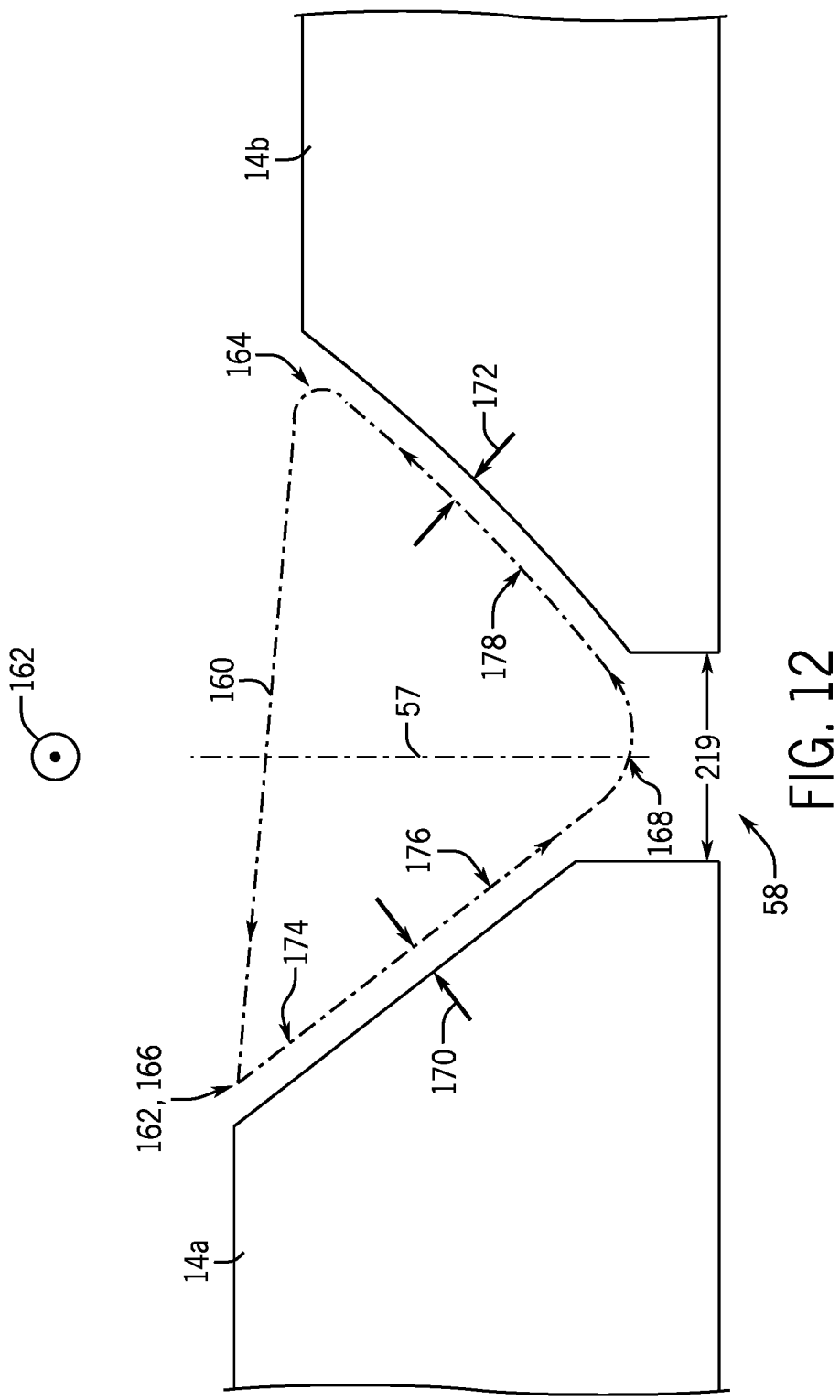
FIG. 12 is a cross-sectional view of an embodiment of the joint and the movement pattern.

FIG. 12 illustrates a cross-sectional view of an embodiment of the joint 58 between workpieces 14a, 14b and the desired pattern 160. The torch moves the electrode 44 in the travel direction 162, which may be understood as out of the cross-sectional plane of FIG. 12. The desired pattern 160 includes a radial portion and may include an axial portion. In some embodiments, the control circuitry 28 controls the axial portion via the motion control assembly 62. Additionally, or in the alternative, the control circuitry 28 may control the axial portion via controlling movement of the torch 24, such as via a welding robot or mechanized torch manipulator. The radial portion of the desired pattern 160 includes radial movement of the electrode 44 between a first radial position 162 and a second radial position 164 in a plane perpendicular to the axis 57 of the torch. The axial portion of the desired pattern 160 includes movement of the electrode 44 axially (e.g., parallel) to the axis 57 between a first axial position 166 and a second axial position 168. In some embodiments, the axial portion is synchronized with the radial portion to enable the electrode 44 to substantially track the geometry of the joint 58. For example, the axial portion of the desired pattern may offset the electrode a first distance 170 from the workpiece 14a and a second distance 172 from the workpiece 14b, where the first distance 170 is not necessarily equal to the second distances 172. In some embodiments, the first and/or the second distances 170, 172 may vary with respect to the center of the joint 58.

The control circuitry 28 may control the axial portion of the desired pattern of the electrode. The electrode 44 moves through the axial portion at an axial movement rate. In some embodiments, the control circuitry synchronizes the axial movement rate with the radial movement rate such that the electrode cycles through the axial portion approximately once per 1, 2, 3, 4, 5, or more cycles through the radial portion. For example, the desired pattern may include a spiral pattern in which the electrode completes more than one cycle of the radial portion for each cycle of the axial portion. In some embodiments, the control circuitry 28 may adjust the movement rate (e.g., radial movement rate and/or axial movement rate) of the electrode 44 during a cycle of moving the welding electrode. For example, the control circuitry 28 may move the electrode at a first movement rate and/or pause over workpiece 14*a*, whereas the control circuitry 28 may move the electrode at a different second movement rate over workpiece 14*b*.

In some embodiments, the axial portion is based on the workpiece material and/or the thickness of the workpiece. For example, some materials may have higher melting temperatures than other materials, which affects the amount of heat to be added to the workpiece to wet the ball with the workpiece. Controlling the axial portion of the desired pattern 160 enables the control circuitry 28 to control where heat is applied to the workpiece 14 in the joint 58. In some embodiments, controlling the axial portion of the desired pattern enables the control circuitry 28 to adjust the area 211 of the weld pool 74 where the ball is transferred. For example, adjusting the distance from the electrode 44 to the weld pool 74 or a side wall of the workpiece 14 adjusts the distance a detached ball may travel in the tangential direction 204 once detached.

In some embodiments, the control circuitry 28 adjusts the polarity and/or the transfer process based at least in part on a position of the electrode in the desired pattern. Controlling the polarity and/or the transfer process during a welding process may change the heat profile applied to the workpiece and electrode. Moreover, controlling the polarity and/or the transfer process during a welding process may control the amount of spatter, the size of formed balls, or the quantity of formed ball, or any combination thereof. For example, the control circuitry 28 may control the transfer process to a pulse or pulse spray transfer process at location 174, and control the transfer process to a short-circuit transfer process (e.g., RMD™) at location 176 on workpiece 14*a*. Across the joint 58, the control circuitry 28 may control the transfer process to a controlled short-circuit (CSC) transfer process at location 178, on workpiece 14*b*, which may be thinner and/or have a lower melting point than workpiece 14*a*. The transfer processes that may be utilized may include, but are not limited to, pulse, spray, globular, short circuit (e.g., RMD™), controlled short-circuit (CSC) with electrode retraction, buried arc, submerged arc, hot wire, axial short circuit clear, radial short circuit clear, or alternating current, or any combination thereof. In a radial short circuit clear transfer process, the electrode forms and/or exits a short circuit with the weld pool from a radial direction. That is, the electrode may move into and out of the weld pool in a radial direction, such as via radial movement in the desired pattern. In an axial short circuit clear transfer process, the electrode forms and/or exits a short circuit with the weld pool from an axial direction. That is the electrode may move into and out of the weld pool in an axial direction. As may be appreciated, movement of the electrode in the axial direction may include, but is not limited to axial movement of the torch, feeding the electrode through the torch into the weld pool, or retracting the electrode from the weld pool, or any combination thereof.

Figure 13:
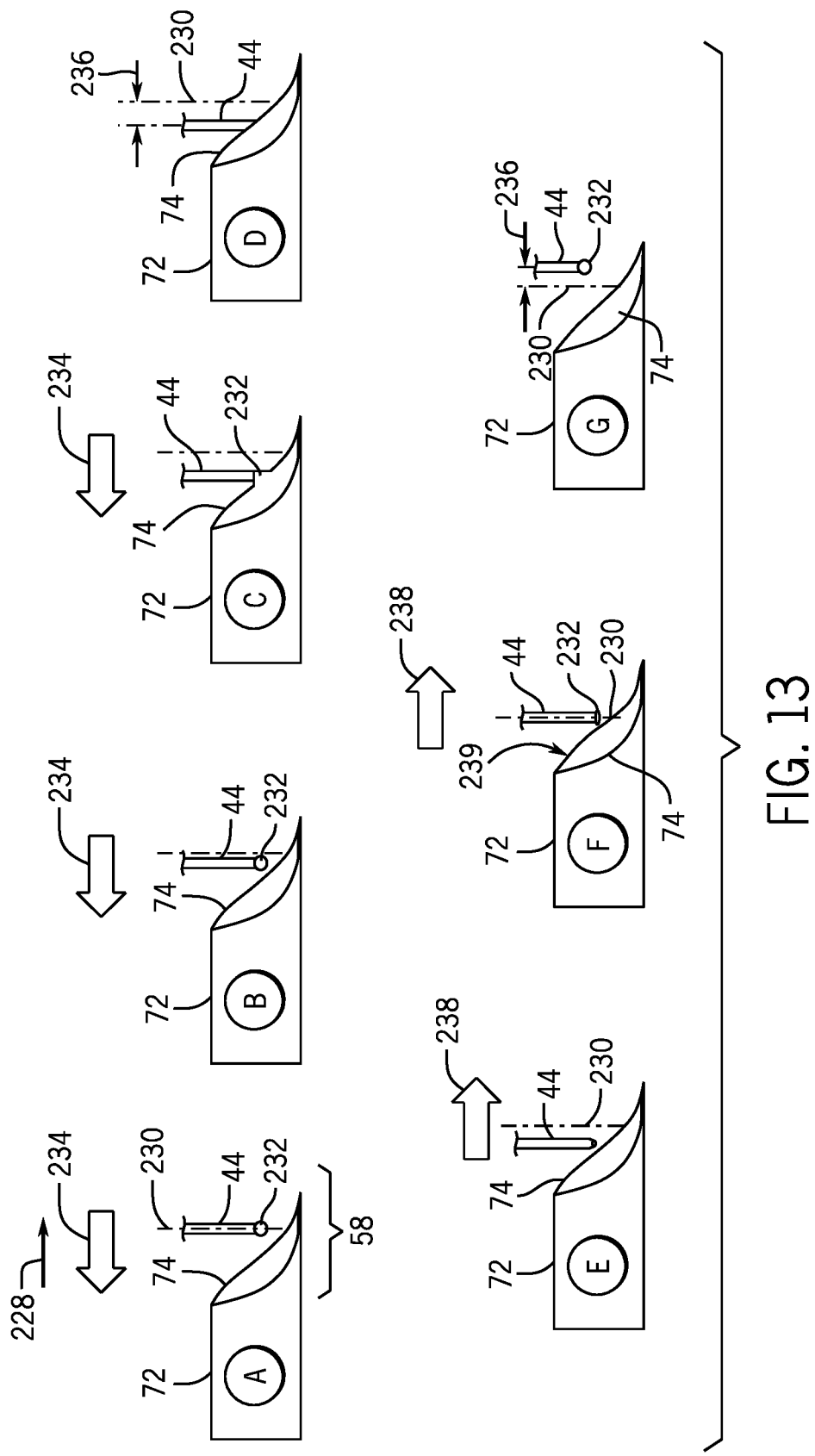
FIG. 13 is a series of positions of an electrode moving relative to a workpiece in a short circuit transfer process.

The control circuitry 28 may move the electrode 44 in the radial directions during operation in a short circuit welding process (e.g., regulated metal deposition (RMD™)). FIG. 13 provides a series of illustrations in which the electrode 44 transfers material to the weld pool 74 via a radial short circuit transfer process as the electrode 44 moves along the movement pattern (e.g., circular pattern 74) and the torch 24 travels in direction 228. FIG. 13 is a cross-section of the weld pool 74 in the longitudinal axis of the weld. In position A, the electrode 44 lies along an axis 230 of the torch 24 as the control circuitry 28 establishes the arc through the electrode 44 to form the ball 232 at the tip of the electrode 44. In position B, the control circuitry 28 controls the motion control assembly 62 to move the electrode 44 and attached ball 232 in a direction 234 towards the workpiece 14 and weld pool 74. As discussed below, in some embodiments the control circuitry 28 controls the power conversion circuitry 26 to reduce current supplied to the electrode 44 in anticipation of a short circuit between the electrode 44 and the weld pool 74. In position C, the control circuitry 28 continues to control the motion control assembly 62 to move the electrode 44 radially toward the workpiece 14 such that the attached ball 232 interfaces (e.g., fuses, melts, wets into, contacts) with the weld pool 74, forming a short circuit between the electrode 44 and the workpiece 14. The ball 232 may begin to detach from the electrode 44 into the weld pool 74 in position C. When the control circuitry 28 has controlled the motion control assembly 62 to move the electrode 44 to position D, which is a distance 236 from the axis 230, the ball 232 may continue to detach from the electrode 44 and merge with the weld pool 74. The distance 236 may be the radius of the movement pattern.

From position D, the control circuitry 28 controls the motion control assembly 62 to move the electrode 44 radially in an opposite direction 238 from the weld pool 74 to clear the short circuit. In some embodiments, a position E the control circuitry 28 senses from arc voltage the separation of the electrode 44 from the weld pool 74 at low current level. In position F, the control circuitry 28 controls the motion control assembly 62 and power conversion circuitry 26 to form another ball 232 on the electrode 44 as the electrode again lies along the axis 230 of the joint 58. In position G, the electrode 44 is moved a distance 236 from the movement axis 232. The control circuitry 28 may control the motion control assembly 62 to repeat positions A through G as the electrode 44 cycles through the movement pattern at the radial movement rate while forming the weld bead 72.

Figure 14:
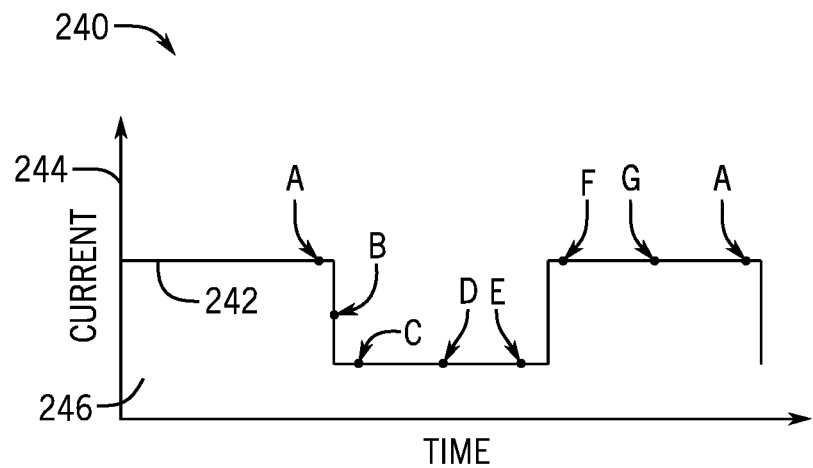
FIG. 14 is a timing diagram of a current waveform applied to the electrode corresponding to the positions of FIG. 13.
Figure 15:
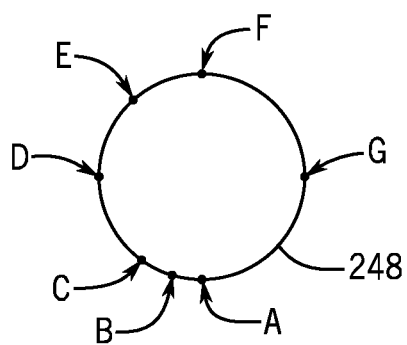
FIG. 15 is a circular movement pattern of the electrode corresponding to the positions of FIG. 13.
Figure 16:
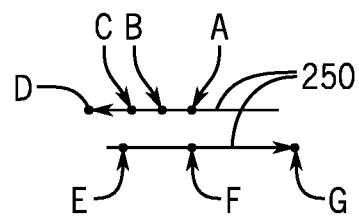
FIG. 16 is a linear movement pattern of the electrode corresponding to the positions of FIG. 13.

FIG. 14 is a graph 240 of a current waveform 242 supplied to the electrode 44 for each of the positions shown in FIG. 13. As such, the current waveform 242 illustrated in FIG. 14 is distinguishable from a conventional current vs. time waveform insofar as the current waveform 242 illustrates the current supplied to the electrode 44 as a function of time, but also as a function of the position of the electrode 44 within the pattern of radial movement. It will also be appreciated that, in certain embodiments, the current waveform 242 may also be a function of axial movement of the electrode 44, as described herein. At position A, the current waveform 242 is at a high value 244 prior to approaching the weld pool 74. As the electrode 44 nears the weld pool 74 at position B, the current waveform 242 decreases such that at position C before the electrode 44 enters the weld pool 74, the current waveform 242 is at a low value 246. The current waveform 242 is at the low value 246 when the electrode 44 is in positions C (e.g., when the electrode 44 initiates contact with the weld pool 74) and D, which correspond to when a short circuit exists between the electrode 44 and the workpiece 14. The current waveform 242 is at the low value 246 at position E as the electrode 44 exits (e.g., clears) the weld pool 74. When the electrode 44 is at position F, the control circuitry controls the current waveform 242 to the high value 244 to form another ball 232. Control of the current waveform 242 to the low value 246 when the electrode 44 enters and exits (e.g., clears) the weld pool 74 may reduce spatter and/or may reduce weld defects. FIG. 15 illustrates a circular movement pattern 248 and FIG. 16 illustrates a transverse joint movement pattern 250. The corresponding positions of the electrode 44 during the short circuit transfer process described in FIGS. 13 and 14 are shown in the movement patterns 248 and 250. In some embodiments, the polarity of the electrode 44 may be altered based at least in part on a position of the electrode in the desired pattern. For example, the electrode 44 may have a first polarity (e.g., positive or negative) when in positions A, B, and C, the electrode may reverse polarity at position D, and have and an opposite second polarity (e.g., negative or positive) when in positions E, F, and G. This enables the polarity (e.g., zero voltage crossing) to be reversed during the short circuit. In some embodiments, changing the polarity at position D may increase control of the heat input to the electrode or workpiece and/or may provide increased stability of the alternating current process relative to changing the polarity at other positions.

Returning now to FIG. 14, it is noted that while a current waveform 242 is illustrated, other parameters of the welding process may be modified with respect to the different (e.g., outer peripheral) positions (e.g., A, B, C, D, E, F, and G) with respect to the weld pool as illustrated in FIG. 13. For example, a voltage waveform, wire feed speed, z-position (e.g., the position of the electrode along the axis 230 illustrated in FIG. 13, for example, nearer to or farther away from the weld pool 74), as well as other parameters relating to the welding process, may be modified based on the position (e.g., A, B, C, D, E, F, and G) of the electrode 44. In other words, any parameter that affects the performance of the welding process may be automatically adjusted and, indeed, synchronized with the oscillations of the electrode 44 such that different desired properties (e.g., more or less penetration, more or less fill, more or less "digging" or "gouging" or base melting by the arc, and so forth) of the weld are achieved at different locations (at leading or trailing edges, near walls, near centerlines, and so forth) within the weld pool 74.

Indeed, even the positions (e.g., A, B, C, D, E, F, and G) illustrated and described with respect to FIGS. 13-16 are merely exemplary and not intended to be limiting. For example, although generally illustrated in FIG. 13 as applying to butt weld joints, other types of weld joints (e.g., tee joints, lap joints, corner joints, edge joints, and so forth) may utilize the techniques described herein, and the variations of the weld parameters as the electrode 44 oscillates may be different for each type of weld joint. As such, the positions (e.g., A, B, C, D, E, F, and G) illustrated in FIG. 13 may be entirely different for a tee weld joint, for example. As an example, in a particular application where a t-fillet has a relatively large weld leg length between approximately 6-15 mm, a relatively large amount of filler metal from the electrode 44 needs to be deposited. As such, a relatively high current and high temperature is required, which can created arc forces that would otherwise tend to gouge the plate being welded. In such a situation, it may be relatively difficult to create an aesthetically pleasing weld at a relatively high speed and high weld strength. In general, in this situation, you want more penetration combined within more filling. More specifically, the hole that gets dug needs to be backfilled.

Figure 22:
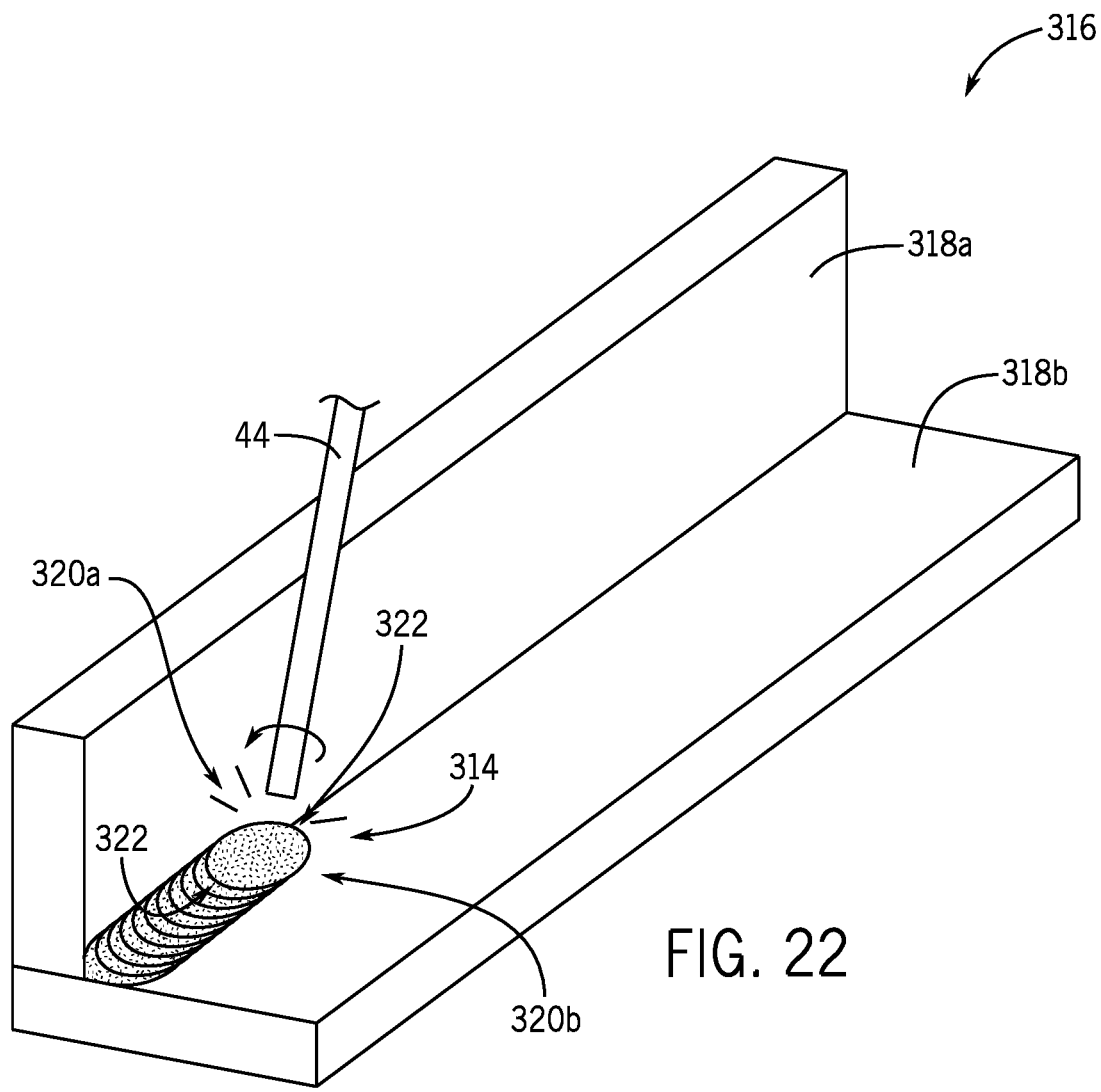
FIG. 22 is a perspective view of a t-fillet weld created using the electrode motion control techniques described herein.

Using the techniques described herein, the digging phase and the filling phase can be separated and controlled accordingly to avoid undercut or unfilled base metal melted away by the arc. FIG. 22 is an illustration of weld 314 being created on a t-joint 316. For example, when the electrode 44 is next to the walls 318 (e.g., analogous to positions 320), the system is in the digging phase, but fluid is needed to backfill the hole. As such, the heat may be reduced when the electrode 44 is close to the walls 318. Conversely, the heat may be increased when the electrode 44 is close to the root (e.g., the back or front sides of the weld bead, analogous to positions 322) such that the root is melted. When in the backside (e.g., trailing side) of the weld pool 74, more heat may be applied without the heat digging a trench in the side walls 318. This type of control separates the filling (e.g., melting the wire) and the penetration (e.g., heating, capturing the root, and so forth). High current may be applied to melt the wire at positions 322, and this can be detected at any point. Then, detachment may occur at the vertical wall 318a to fill the holes (e.g., by reducing the arc current, but ejecting the liquid because just the right amount of liquid has been created during the melting phase). It is noted that undercut often occurs at the vertical wall 318a. In certain situations, you may detach two drops at the vertical wall 318a, and just one at the bottom wall 318b. When welding at higher speeds, the weld bead tends to roll up on the bottom wall 318b. More heat can be applied when the electrode 44 is moved to position 320b on the bottom wall 318b so that more wetting can take place to prevent bead roll up. In general, it is desirable to have enough heat to capture the root when at the front (leading) side of the weld bead, and to have a concave melt having relatively high fatigue strength (again, by affecting the drop distribution), thereby leading to relatively large toe radius and good fatigue strength.

In general, in certain embodiments, additional heat may be applied to a location ahead of the weld pool along the weld path to preheat the root and to ensure weld penetration at the root. In addition, in certain embodiments, additional heat may be applied to a location 320b on the bottom wall 318b (i.e., the horizontal member) of the t-fillet joint to promote wetting and prevent a roll-over bead profile on the bottom wall 318b. In addition, a lower amount of additional heat may be applied to a location 320a on a vertical wall 318a (i.e., the vertical member) of the t-fillet joint to avoid undercut from an arc gouging effect, and an increased amount of material from the electrode 44 is transferred to the location 320a on the vertical wall 318a to cover or replace workpiece metal removed by the arc and, thus, to avoid undercut on the vertical wall 318a.

Moreover, although illustrated in FIG. 14 as being cyclical (e.g., repeating in an identical nature) between cycles of oscillation (e.g., A through G), in other embodiments, the welding parameters (e.g., the current waveform 242 of FIG. 14 as a non-limiting example) that are automatically controlled based on these positions may not be repeated in a cyclical manner Rather, there may be variations of a particular welding parameter between any given position of a cycle of oscillation. For example, using the current waveform 242 illustrated in FIG. 14, instead of being at the same current at both positions A, the current at the second instance of A (i.e., during the second illustrated cycle of oscillation) may be slightly reduced as compared to the current at the first instance of A (i.e., during the first illustrated cycle of oscillation). Such variations between cycles of oscillation may enable adaptive control of the produced weld pool 74 as the weld progresses along the weld joint.

In some embodiments, forces on the weld pool 74 may form ripples in the weld pool 74, which is at least partially a fluid. Forces on the weld pool 74 may include, but are not limited to, the addition of the molten ball 232, movement of the electrode 44, the arc, the shielding gas, gravity, and movement of the workpiece. As the electrode 44 enters and exits the weld pool 74 based at least in part on the radial movement rate, rhythmic ripples or waves may form on a surface 239 of the weld pool 74. In some embodiments, the movement of the electrode 44 may be synchronized with the rhythmic ripples of the weld pool 74 such that the electrode 44 enters and exits the weld pool 74 at regular intervals, thereby forming a short circuit at regular intervals. Accordingly, the control circuitry 28 may control the electrode 44 and the current waveform 242 in a short circuit transfer process based on the regular short circuit interval rather than other factors to forecast or predict when the short circuit will occur. In some embodiments, rhythmic movement of the electrode 44 relative to the weld pool 74 may reduce the effects of one or more of gravity, surface tension, or an electrical pinch force to transfer material from the electrode 44 to the weld pool 74.

Figure 17:
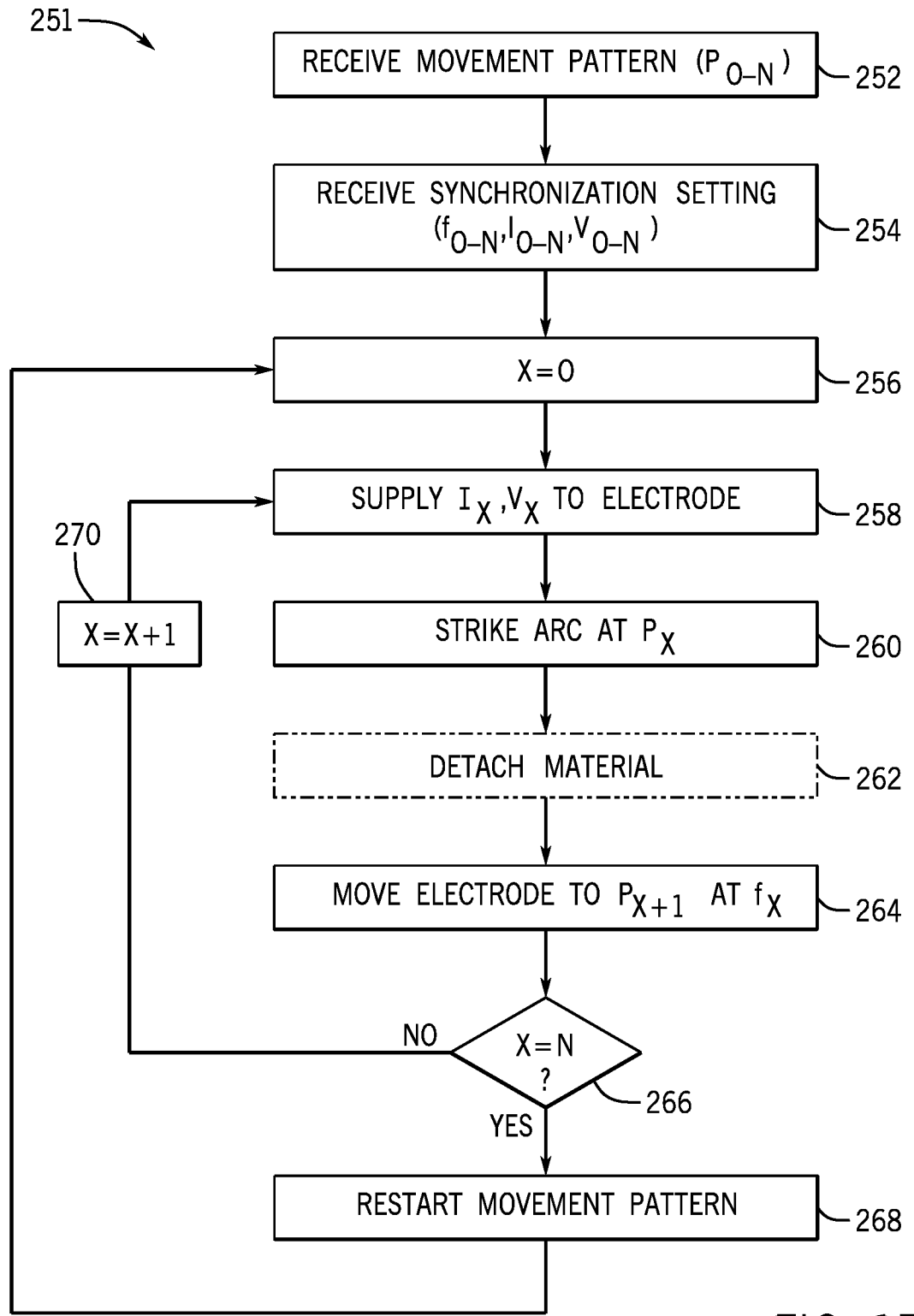
FIG. 17 is a method flow diagram illustrating synchronization of welding parameters to a position of the electrode.

The control circuitry 28 may synchronize the movement pattern and/or the radial movement rate of the electrode 44 with welding parameters such that a desired set of welding parameters are supplied to the electrode 44 at a desired position of the movement pattern. Welding parameters may include, but are not limited to, the welding current supplied to the electrode 44, the welding voltage supplied to the electrode 44, the wire feed speed, the travel speed, and the radial movement rate of the electrode 44. FIG. 17 illustrates an embodiment of a method 251 of controlling the electrode 44 to synchronize the movement pattern of the electrode 44 with desired welding parameters. The control circuitry 28 receives (block 252) a movement pattern, which may include a circular, elliptical, zigzag, or other movement pattern as described above. In some embodiments, the movement pattern is based at least in part on the workpieces, the joint fit up, or operator input via the operator interface. The movement pattern may be a series of positions $P_{0-N}$ for the electrode relative to the workpieces.

The control circuitry 28 receives (block 254) synchronization settings corresponding to each of the positions of the movement pattern. The synchronization settings may include, but are not limited to, radial movement rates ($f_{0-N}$) between the positions, weld power ($I_{0-N}$, $V_{0-N}$) at the positions, and wire feed speed at the positions. Accordingly, the control circuitry 28 may synchronize the welding parameters with the movement pattern such that a set of welding parameters corresponds to each position of the series of positions $P_{0-N}$. In some embodiments, the position of the electrode 44 may be determined via an encoder coupled to the motor 66 of the motion control assembly 62, a position sensor coupled to the contact element 60, or a linear variable differential transformer (LVDT) coupled to the contact element 60. Additionally, or in the alternative, commanding pulse steps controlling movement of the contact element 60 and electrode 44 may be utilized to determine the position of the electrode 44. The welding parameters for each position may be selected based on a counter that the control circuitry 28 resets (block 256) prior to initiating the weld process.

The control circuitry 28 supplies (block 258) welding power to the electrode 44 and strikes (block 260) the arc between the electrode 44 and the workpiece at position $P_x$. The control circuitry 28 may control the wire feed speed and travel speed to respective values that correspond to position $P_x$. At some positions $P_x$, the corresponding welding parameters cause material to detach (block 262) from the electrode 44. As discussed above, although the material may detach at position $P_x$, the material may be deposited on the workpiece at a different location due to the radial movement rate of the electrode 44. The control circuitry 28 controls the motion control assembly 62 to move (block 264) the electrode from $P_x$ to $P_{x+1}$ at the radial movement rate $f_x$. If the counter value indicates the end of the movement pattern (node 266), the control circuitry 28 restarts (block 268) the movement pattern by resetting (block 256) the counter. As may be appreciated, while the movement pattern may repeat, the control circuitry 28 controls the motion control assembly 62 to move the electrode 44 along the joint at the travel speed such that the repeated movement pattern deposits material at different locations along the joint. If the counter value is less than the value at the end of the movement pattern, the control circuitry 28 steps (block 270) the counter to the next value. The control circuitry 28 then repeats blocks 258-264 for each incremental position of the movement pattern until the end of the movement pattern or the operator/robot stops welding.

The control circuitry 28 may synchronize the movement pattern of the electrode 44 with welding parameters to deposit the material in desired locations in the joint. As discussed above, FIGS. 10 and 11 illustrate an embodiment in which the welding current is synchronized with the radial movement rate and a movement pattern so that the material is deposited at the locations 210, 212, or 216 rather than the front of the weld pool 74. In some embodiments, the control circuitry 28 controls the welding parameter such that material is transferred to the weld pool at one or more locations (e.g., 1, 2, 3, 4, 5, 6, 7, 8, 9, 10, or more locations) per cycle of the radial movement along the movement pattern. In some embodiments, the control circuitry 28 may synchronize the radial movement rate of the electrode 44 with the wire feed speed and/or the weld current to reduce spatter. For example, the control circuitry 28 may reduce the radial movement rate when the wire feed speed and/or the weld current is increased.

In addition to the foregoing examples, it has been found that the use of DCEN welding procedures with the metal cored wired discussed above, with mechanical movement of the arc, may provide particularly good results, and may be even more attractive on certain types of workpieces (or baseplate materials). For example, the Metalloy® X-Cel™ wire mentioned above is particularly well suited to reduce spatter, while enhancing weld metal wetting (avoiding overly "crowned" beads). The use of a DCEN process, moreover, with arc movement and in combination with such wires, reduces overheating. The combination may be particularly useful for galvanized sheet material welding (e.g., in automotive applications), for coated or painted material welding, for thin steel welding (e.g., in furniture manufacturing), and so forth.

It is currently believed that welding wires suitable for these applications (corresponding generally to the X-Cel™ wire mentioned) are characterized by components that stabilize the arc (producing stable arcs with reduced spatter). For example, such stabilizers may include potassium and compounds that contribute potassium during the welding process (such as potassium feldspar, potassium titanate, potassium manganite-titanate, potassium sulfate, potassium carbonate, potassium phosphate, potassium molybdate, potassium nitrate, potassium fluosilicate, and complex oxide compounds containing potassium). Moreover, graphitic and non-graphitic carbon sources may provide stabilization by sublimating into the arc column and by rendering finer droplet metal transfer. Possible modification of existing welding wires (such as those mentioned) could include potassium from any other or more sources noted above, and a suitable carbon source, such as graphite or carbon containing iron and/or alloy powders.

In some embodiments, welding processes that move the electrode 44 in a movement pattern may be utilized to clad the workpiece with a filler material (e.g., consumable electrode). MIG and TIG welding processes may be utilized to clad the workpiece. Filler materials may include, but are not limited to, stainless steel alloys, inconel alloys, nickel-based titanium alloys, and other corrosion resistant materials. It is believed that radial movement (e.g., oscillating about a central axis) of the electrode 44 may reduce the heat applied by the arc to the workpiece 14, thereby reducing the dilution of the filler material by the molten portion of the workpiece 14. In some embodiments, radial movement of the electrode 44 and the arc may agitate the weld pool 74, thereby increasing the mixing of composite cladding materials on the workpiece 14.

The movement pattern (e.g., circular, elliptical, reciprocating lines) of the electrode 44 may cause the electrode 44 to move over portions of the previously transferred weld bead 90 (e.g., the weld pool 74). In some embodiments, the arc 96 from the electrode 44 reheats and tempers the weld bead 90. The reheating from the movement pattern of the electrode 44 may refine the grains of the transferred material and alter the orientation of the grains, thereby affecting the microstructure and mechanical properties of the weld bead 90 upon cooling and solidification. For example, the reheating of the weld bead 90 may increase the impact resistance of the weld bead 90.

Regarding the particular DCEN processes involved, these will typically be performed at currents and voltages selected based at least in part on the electrode diameter, the electrode extension (e.g., contact tip to plate), the welding position, the workpiece or base plate type and diameter, the travel speed and deposition rates, the wire feed speed, and so forth. For example, voltages ranging from 21 to 30 Volts may be suitable, with currents ranging from 150 to 450 Amps. Moreover, regarding shielding gases, appropriate gas mixes are believed to include argon and carbon dioxide, with a minimum of 75% and a maximum of 95% argon (although other amounts and combinations may be satisfactory, such as 98% argon, 2% oxygen). Still further, it is contemplated that the DCEN polarity selected may include non-pulsed and pulsed current.

Figure 18:
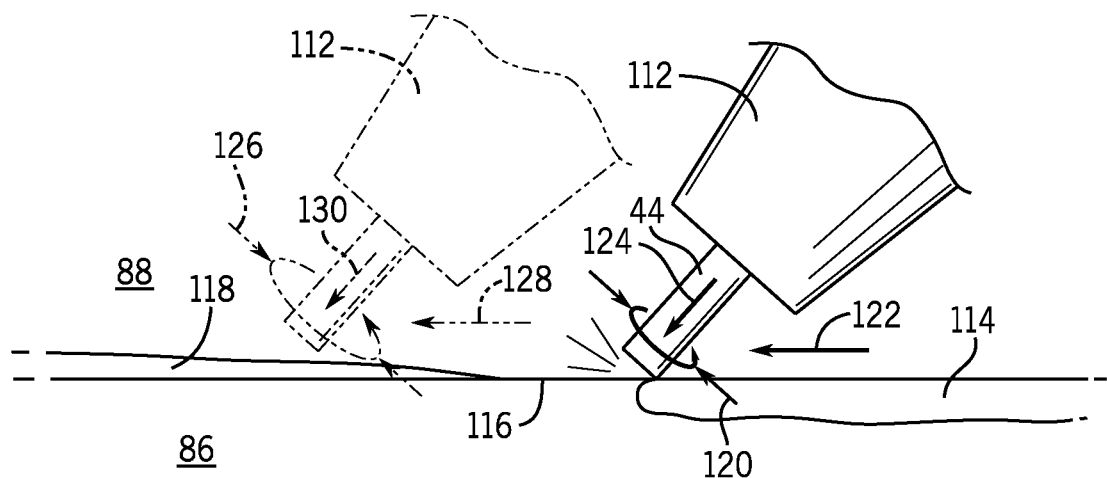
FIG. 18 is an illustration of a progressing welding torch nozzle and weld bead with initial weld parameters and a phantom view of the same welding torch nozzle as it encounters a gap along the weld path with newly adjusted weld parameters.

In a presently contemplated embodiment, various parameters of a welding system of the type described above may be altered during welding to accommodate various fit-up issues that are detected. For example, as illustrated in FIG. 18, as welding progresses, the welding torch nozzle 112 and electrode leave behind an advancing weld bead 114 while traveling along a predetermined weld line 116. As illustrated, the line of the weld will encounter a gap or fit-up problem, as indicated generally by reference numeral 118. The weld line is developed as a result of an initial spin geometry 120, travel speed 122 and wire feed speed 124. Any suitable parameters may be utilized, depending upon such factors as the materials of the workpiece, the type and size of wire electrode, and so forth. In general, it should also be noted that the "spin geometry" may comprise various factors, including the diameter or radius of movement of the electrode tip, the pattern of movement, and so forth. These initial parameters taken together create a weld bead of a width and penetration adequate to avoid defects in the finished welded piece. These initial parameters may then be varied in a number of ways to compensate for problems in fit-up, such as gaps encountered between the workpieces. Because the fit-up may vary along the weld path, the weld parameters may need to be adjusted into a new combination adequate to avoid defects in the weld. As shown in the phantom view of FIG. 18, these new parameters may include second spin geometry 126 (e.g., a different diameter or radius of movement of the electrode tip), second travel speed 128 and second wire feed speed 130, adjusted as the weld torch approaches the fit-up, are directly related to the measurement constraints posed by the gap (fit-up parameter) 118.

Figure 19:
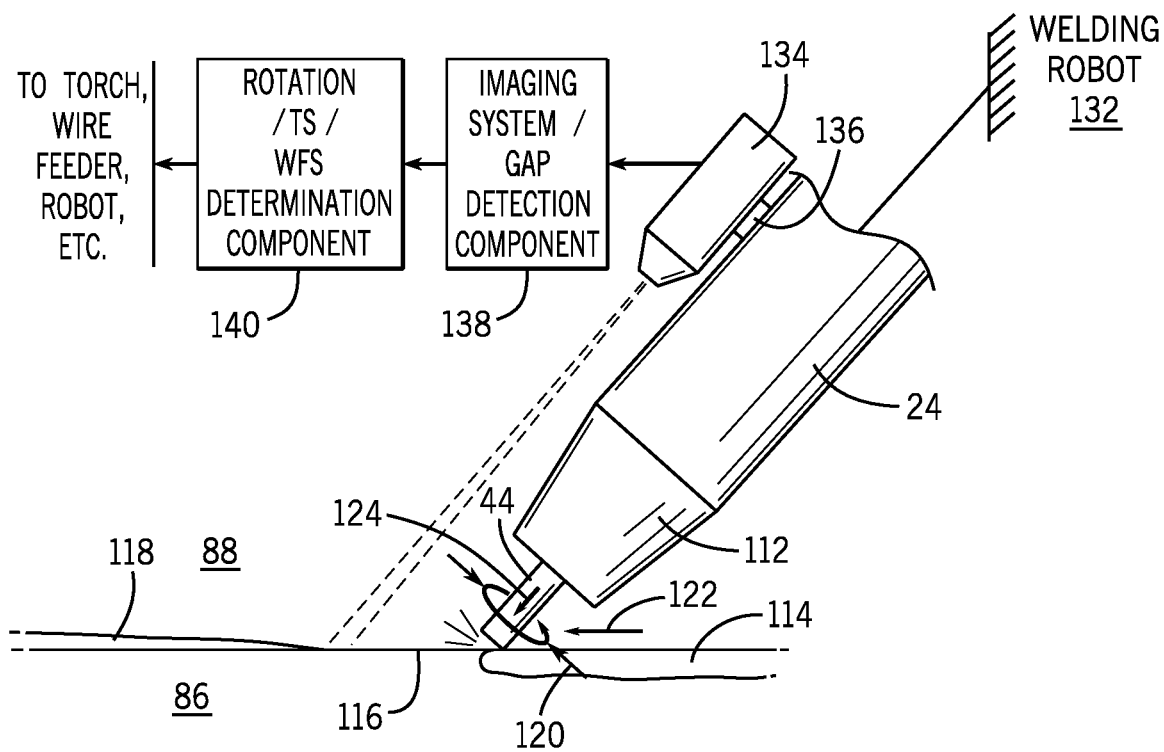
FIG. 19 is an illustration of the camera/detection device detecting fit-up along the weld path and delivering that information to the imaging and parameter calculation components in order to adjust welding parameters.

As illustrated in FIG. 19, in an exemplary application, a welding robot 132 moves the welding torch 24 along the weld line. As may be appreciated, some embodiments move the workpiece relative to the welding torch 24 operated by a fixed automation system. A camera/detection device 134 that is responsible for monitoring any changes in the fit-up along the weld path is attached to the torch via a mechanical mount 136, allowing the detection device to move along with the torch. The device is positioned in such a way as to allow it to examine the fit-up between workpieces 86 and 88 just ahead of the torch. This information, which may be in the form of a pixelated image, allows the imaging system/gap detection component 138 to note the parameter changes between the weld line and the gap 118. This may be done, for example, by detecting spaces or pixels indicative of a developing gap (or conversely, of more closely fitting pieces). This information is then transmitted to a parameter calculation component 140 which determines which, if any, of the initial weld parameters need to be adjusted in order to properly fill in the gap with a sufficient amount of material. Additionally, or in the alternative, changes in the fit-up may be detected through monitoring (e.g., via the control circuitry) the changes in the weld parameters including, but not limited to one or more of the weld current, the weld voltage, or the contact tip to work distance. The determination of appropriate parameter adjustments may be performed by appropriate calculations, look-up tables, or any other desired algorithm. Such tables may, for example, call out various fit-up or gap parameters (e.g., size or distance), and relate these to the wire feed, travel speed of the welding torch and/or the workpiece, power, electrode spin, and so forth appropriate for the particular fit-up. For example, this component may determine that the new spin geometry necessary for the gap should to be larger or smaller, or of a different shape, which require changing the manner in which the electrode is moved. Furthermore it may be determined that the travel speed may remain the same as before and/or that the wire feed speed should increase/decrease. At the same time, it may be determined that the charge to the electrode should be adjusted as well. At this point, these parameters are adjusted according to the determination and the weld torch continues its advance towards the gap. It should be noted that when parameters are to be adjusted to accommodate changes in fit-up, these are generally controlled by the appropriate system component involved. For example, changes in weld power are adjusted by the power source or supply. Changes in wire feed speed are made by the wire feeder. Changes in travel speed, in automated applications, are adjusted by the robot that moves the welding torch. Changes in spin geometry are implemented by the mechanism within the welding torch that moves the welding electrode. Those skilled in the art will readily appreciate that these devices may be designed to implement the altered parameters during the welding operation.

Figure 20:
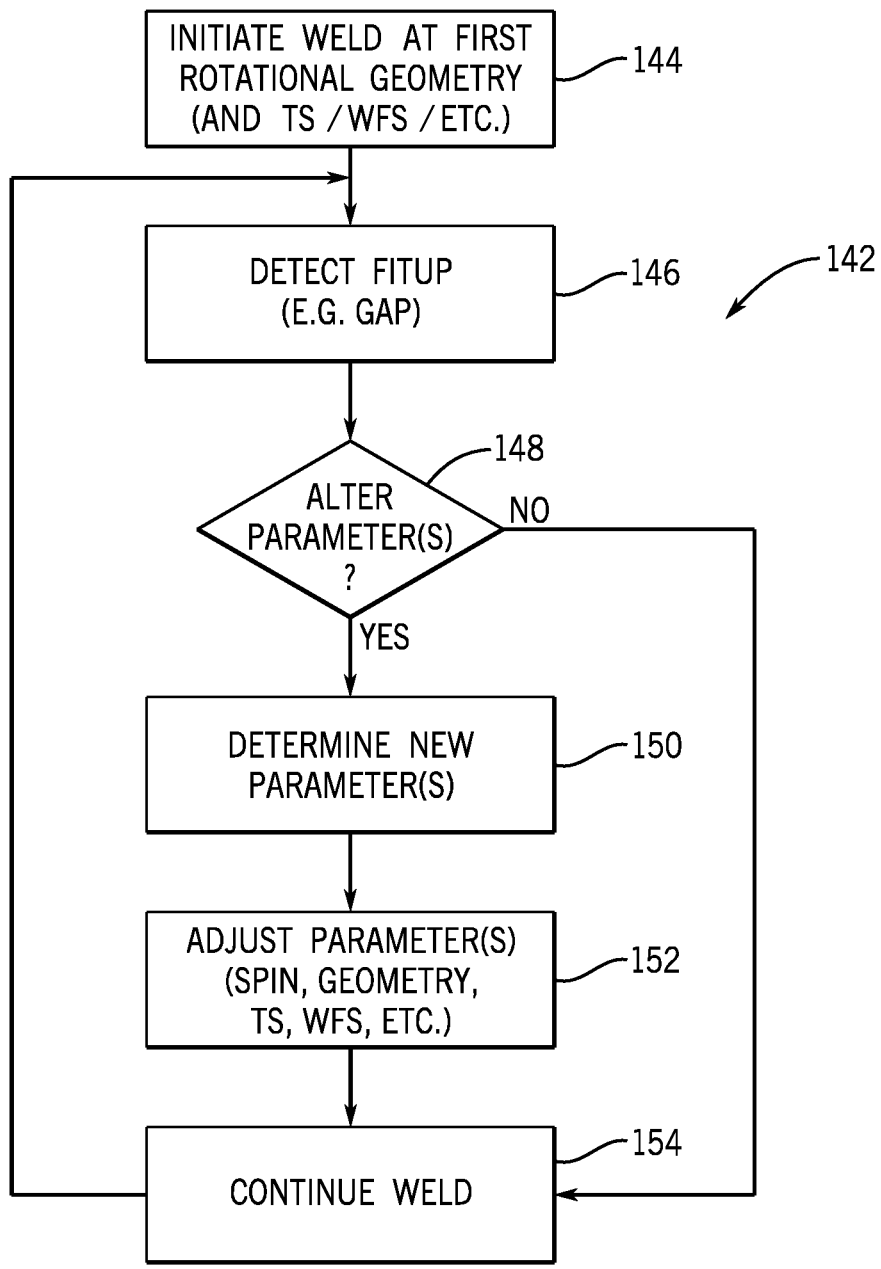
FIG. 20 is a method flow diagram illustrating exemplary logic employed to determine whether and how to adjust one or several of the weld's parameters.

The ability to detect gaps and change weld parameters as necessary is summarized in FIG. 20, which is a method flow diagram showing exemplary control logic 142 employed by the system components to address fit-up changes, such as gaps between the workpieces. As the welding torch and electrode approach a gap, they do so with their initial rotational geometry, travel speed, wire feed speed and weld power applied to the electrode, as indicated at step 144. The detection device then detects and measures the fit-up via imaging, as indicated at step 146, with the associated information being used to determine whether the parameters should be changed, as indicated at step 148. If the path of the weld line does not warrant a variation to the initial parameters the weld torch continues to operate and advance along the weld line with the same geometry, travel speed, wire feed speed and weld power applied to the electrode. In this case the detection device simply continues to detect fit-up, returning to step 146. In the event the control determines that the initial parameters should be changed, the control logic advances to either calculating those changes or obtaining the figures via a lookup table, as indicated at step 150. Here, one or any combination of parameters, such as spin geometry, welding torch and/or workpiece travel speed, feed speed of the wire and weld power may be adjusted in order to adequately weld the workpieces together across the gap. After making the determination, the appropriate parameters are adjusted, as indicated at step 152, in accordance with the calculations/look-up table and the weld torch continues welding, as indicated at step 154. After welding over the gap, or more generally after implementing the new parameters, the control logic returns to step 144 where it continues the process of monitoring fit-up (step 146) and determining whether weld parameters should be altered (step 148). It should be noted that if fit-up improves during welding, such as following closure of a gap, the same logic may allow for similar alteration of the welding system parameters to reflect the improved fit-up.

The control circuitry 28 may control the movement of the torch 24 and/or the movement of the electrode 44 to form the weld bead 72 in the joint 58. As discussed above, the control circuitry 28 may detect fit-up conditions and control the welding system 10 to enable the formation of a desired weld bead 72 despite the detected condition. For example, the control circuitry 28 may enable the welding system 10 to form a substantially uniform weld bead despite variations in the fit-up gap and/or a high-low condition of the workpiece (e.g., of a groove joint, of a butt joint, etc.). In some embodiments, the control circuitry 28 may compensate for variations in the fit-up (e.g., high-low condition, changes in fit-up gap) of the joint 58 by adjusting the desired pattern of the electrode. For example, the control circuitry 28 may adjust the geometry (e.g., radial shape, axial shape) of the desired pattern, the radial movement rate of the welding electrode in the desired pattern, or the axial movement rate or position of the welding electrode in the desired pattern, or any combination thereof. Additionally, or in the alternative, the control circuitry may adjust parameters of the welding system, such as the transfer process, the weld output polarity, the weld output power, the travel speed of the torch, the torch angle, or the travel angle of the torch, or any combination thereof.

Figure 21A:
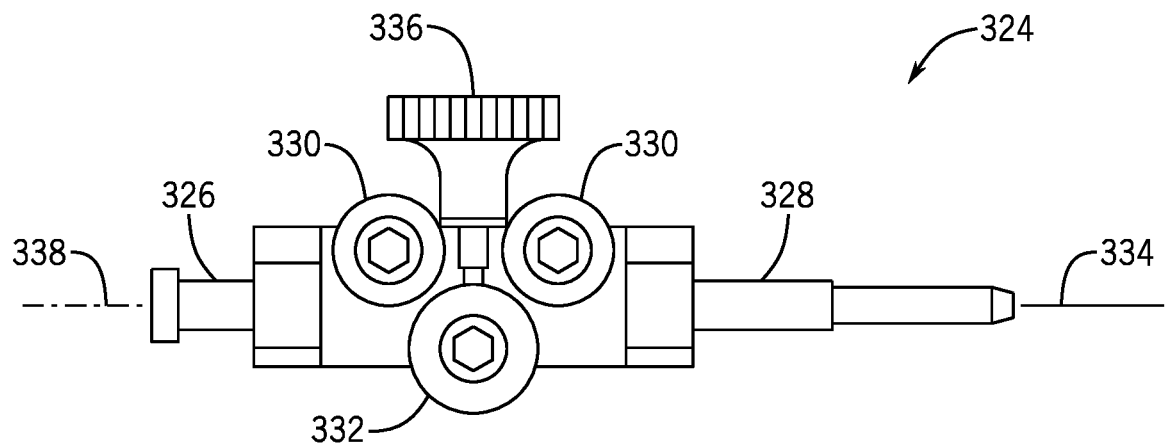
FIGS. 21A and 21B are side views of an embodiment of a wire straightener assembly that may be used to cause the oscillating motion of the electrode.

As described above with respect to FIGS. 3 and 4, various mechanical features of the motion control assembly 62 may be used to produce the radial oscillations of the electrode 44 in two dimensions 302, 306 of a plane generally perpendicular to (taking the slight movements of the oscillations into account) an axis of the electrode 44. The mechanical features described above are merely exemplary and not intended to be limiting insofar as any mechanical means for producing these oscillations may be used. For example, in certain embodiments, mechanical features similar to wire straighteners may be used to produce the oscillations. FIG. 21A illustrates a side view of a wire straightener assembly 324. As illustrated, in general, the wire straightener assembly 324 includes an inlet wire guide 326, an outlet wire guide 328, two upper rollers 330, one lower roller 332, and a pressure adjustment knob 334. In general, the welding wire 334 is fed through the inlet wire guide 326 and the outlet wire guide 328 and, in between these two guides 326, 328, the welding wire 334 is straightened such that it exits the outlet wire guide 328 traversing a general straight path. In particular, the rollers 330, 332 act upon the welding wire 334 to ensure that the welding wire 334 exits the outlet wire guide 328 traversing a generally straight path. The pressure adjustment knob 336 may be used to adjust the pressure on the welding wire 334.

Figure 21B:
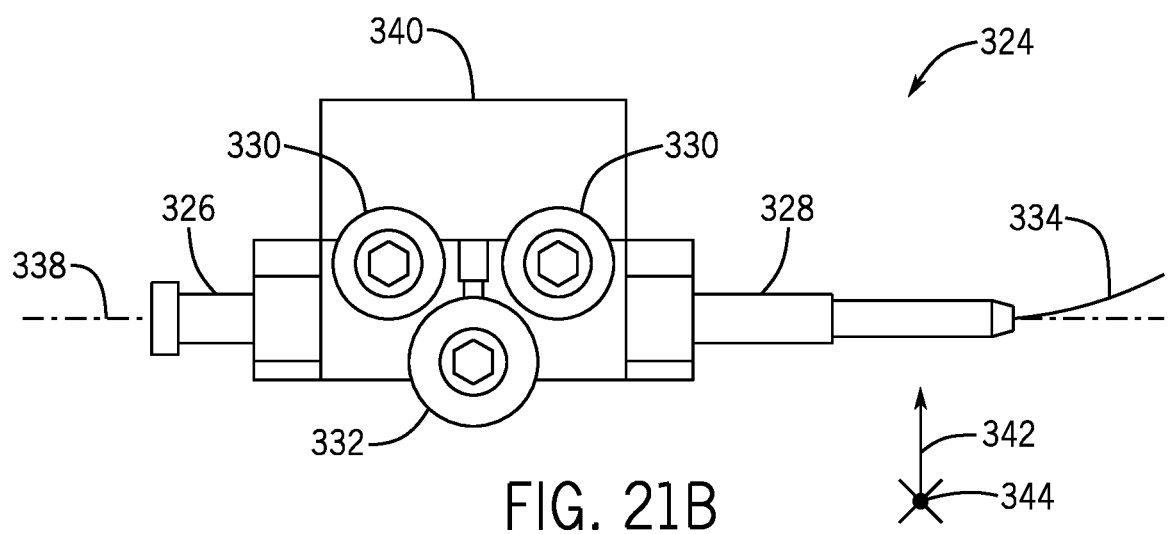

In the context of the present invention, as illustrated in FIG. 21B, instead of ensuring that the welding wire 334 exits the outlet wire guide 328 in a generally straight manner (e.g., parallel to an axis 338 of the inlet and outlet wire guides 326, 328), the rollers 330, 332 may instead be manipulated by an automated pressure adjustment system 340 (i.e., instead of a manual pressure adjustment knob 336) to cause the welding wire 334 to exit the outlet wire guide 328 with a given curvature (i.e., not traversing generally parallel to the axis 338 of the inlet and outlet wire guides 326, 328). It will be appreciated that while illustrated in FIG. 21B as including mechanisms for causing curvature of the welding wire 334 exiting the outlet wire guide 328 in a first dimension 342 perpendicular to the axis 338 of the inlet and outlet wire guides 326, 328, similar additional mechanisms may be used to cause curvature of the welding wire 334 exiting the outlet wire guide 328 in a second dimension 344 perpendicular to the axis 338 of the inlet and outlet wire guides 326, 328. It will be appreciated that the curvature of the welding wire 334 exiting the outlet wire guide 328 produces the radial oscillation described above with respect to FIGS. 3 and 4. In other words, the wire straightener assembly 324 of FIG. 21B (modified to cause curvature of the welding wire 334 in the two dimensions 342, 344) may constitute at least a portion of the motion control assembly 62 described above.

While the embodiments described above discuss welding processes utilizing consumable electrodes (e.g., metal cored, flux cored, solid, or tubular wires), the torch utilizing a non-consumable electrode (e.g., tungsten electrode) may also move and/or rotate. As with the consumable electrode, movement of the non-consumable electrode according to a movement pattern may move the arc. The moving arc affects the amount of heat transferred to the workpiece. In some embodiments, radial movement of the non-consumable electrode may improve the fusion of the weld bead into the side walls of the joint. As may be appreciated, an automated system may be utilized to feed a filler material into the joint while moving and/or rotating the non-consumable electrode.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
   a welding torch configured to receive welding power and a welding wire;
   a welding wire motion control assembly associated with the welding torch and configured to move the welding wire as the welding wire is advanced towards a workpiece to establish a weld, wherein the welding wire motion control assembly includes a first actuator arranged along a first axis of the welding wire opposite one or more bias elements, the first actuator configured to move the welding wire radially in a desired pattern with respect to a central axis of the welding torch; and control circuitry configured to alter the welding power provided to the welding wire and to control a transfer of a material from the welding wire to a first location at an outer periphery of a weld pool of the weld.

2. The welding system of claim 1, wherein the first actuator of the welding wire motion control assembly comprises a motor, one or more solenoids, one or more magnets, one or more linear actuators, one or more linear motors, one or more planetary gears, one or more piezoelectric actuators, or any combination thereof.

3. The welding system of claim 1, wherein the desired pattern comprises a circle, an ellipse, a zigzag, a FIG. 8, a transverse reciprocating line, a crescent, a triangle, a square, a rectangle, a non-linear pattern, an asymmetrical pattern, a pause, or any combination thereof.

4. The welding system of claim 1, wherein the control circuitry comprises circuitry of at least one of a power supply and a wire feeder.

5. The welding system of claim 1, wherein the welding wire motion control assembly is configured to move the welding wire radially in the desired pattern at a radial movement rate between approximately 5 Hz and approximately 200 Hz.

6. The welding system of claim 1, wherein the welding wire motion control assembly comprises an encoder or a linear variable differential transformer (LVDT).

7. The welding system of claim 1, wherein the welding wire motion control assembly is configured to move the welding wire axially in the desired pattern.

8. The welding system of claim 7, wherein the welding wire axial movement rate is between approximately 5 Hz and 200 Hz.

9. The welding system of claim 7, wherein the welding wire motion control assembly is configured to retract the welding wire axially away from the weld pool.

10. The welding system of claim 7, wherein the control circuitry is configured to control a current supplied to the welding wire based at least in part on an axial or radial position of the welding wire.

11. The welding system of claim 7, wherein the axial position of the welding wire is synchronized with the radial position of the welding wire.

12. The welding system of claim 7, wherein the desired pattern is three dimensional via coordinated axial and radial movements.

13. The welding system of claim 1, comprising a welding robot or a mechanized torch manipulator coupled to the welding torch and controlled at least in part by the control circuitry.

14. The welding system of claim 1, wherein the material from the welding wire is transferred to the first location via a short circuit transfer.

15. The welding system of claim 14, wherein the control circuitry is configured to control a current supplied to the welding wire to decrease prior to initiating a short circuit and prior to exiting the short circuit.

16. The welding system of claim 15, wherein the control circuitry is configured to control the current supplied to the welding wire to increase after exiting the short circuit.

17. The welding system of claim 1, wherein the material from the welding wire is transferred to the first location via one or more of pulsed droplet transfer, spray transfer, or globular transfer.

18. The welding system of claim 1, wherein the material from the welding wire is transferred to the first location via one of pulsed, spray, or globular transfer, and the transfer is assisted by centrifugal force of the radial movement of the welding wire.

19. The welding system of claim 1, further comprising a second actuator arranged at a second axis along the welding wire orthogonal to the first axis and opposite another bias element of the one or more bias elements.

20. The welding system of claim 1, wherein the one or more bias elements are springs.

* * * * *